(12) United States Patent
Zhou et al.

(10) Patent No.: US 11,482,894 B2
(45) Date of Patent: Oct. 25, 2022

(54) ELECTRIC MACHINE WITH COMBINED AXIAL- AND RADIAL-FLUX

(71) Applicant: Mitsubishi Electric Research Laboratories, Inc., Cambridge, MA (US)

(72) Inventors: Lei Zhou, Austin, TX (US); Bingnan Wang, Belmont, MA (US); Hongyu Wang, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 194 days.

(21) Appl. No.: 17/071,386

(22) Filed: Oct. 15, 2020

(65) Prior Publication Data

US 2022/0123607 A1   Apr. 21, 2022

(51) Int. Cl.
*H02K 1/16* (2006.01)
*H02K 1/18* (2006.01)
*H02K 1/276* (2022.01)
*H02K 16/04* (2006.01)
*H02K 21/24* (2006.01)

(52) U.S. Cl.
CPC ............... *H02K 1/16* (2013.01); *H02K 1/182* (2013.01); *H02K 1/2766* (2013.01); *H02K 16/04* (2013.01); *H02K 21/24* (2013.01)

(58) Field of Classification Search
CPC ............ H02K 1/04; H02K 1/148; H02K 1/16; H02K 1/182; H02K 1/2766; H02K 16/00; H02K 16/04; H02K 21/12; H02K 21/22; H02K 21/24
See application file for complete search history.

(56) References Cited

U.S. PATENT DOCUMENTS

| 5,894,902 | A | 4/1999 | Cho | |
|---|---|---|---|---|
| 7,999,501 | B2* | 8/2011 | Atarashi | H02K 16/04 |
| | | | | 318/720 |
| 2007/0228860 | A1* | 10/2007 | Rao | H02K 21/12 |
| | | | | 310/268 |

FOREIGN PATENT DOCUMENTS

| JP | 6402739 | 10/2018 | |
|---|---|---|---|
| WO | 03094328 | 11/2003 | |
| WO | WO-03094328 A1 * | 11/2003 | ............. H02K 1/182 |
| WO | 2013022351 | 2/2013 | |
| WO | 2016014717 | 1/2016 | |

* cited by examiner

*Primary Examiner* — Naishadh N Desai
(74) *Attorney, Agent, or Firm* — Gennadiy Vinokur; Hironori Tsukamoto

(57) ABSTRACT

An axial-flux and radial-flux motor including a rotor mounted rotatably about a machine axis, with the rotor rotatively attached to a shaft. A stator assembly having a core with a non-ferromagnetic material and including a first axial-flux stator yoke with an inner wall rigidly attached on an outer surface of a first edge wall of the core. A second axial-flux stator yoke having an inner wall rigidly attached on an outer surface of a second edge wall of the core. The first and the second axial-flux stator yokes each include an outer wall with slots. A radial-flux stator yoke with slots includes an inner wall rigidly attached on a continuous outer wall of the core. The radial-flux stator yoke and the first and the second axial-flux stator yokes include laminated sheets. Windings positioned in the slots of the first and the second axial-flux stator yokes and the radial-flux stator yoke.

22 Claims, 10 Drawing Sheets

*(Type I - Exploded view of Outer Runner Electric Motor Assembly)*

*Type II - Cross-section of Outer Runner Electric Motor Assembly*

ELECTRIC MACHINE WITH COMBINED AXIAL- AND RADIAL-FLUX

TECHNICAL FIELD

The present disclosure relates to motor designs for motors including combined axial-flux and radial-flux motor and outer runner electric motors with direct-drive applications without a gear-box, and in particular, motors having stator cores with non-ferromagnetic materials to allow for electrical laminations which reduces loses and improves torque.

BACKGROUND

Conventional electric motors are one of the most significant energy conversion systems used in industry today. Conventional electric motors convert electric energy into mechanical energy. Most conventional electric motors operate through interaction between the motor's magnetic field and electric current in a winding to generate a force in the form of rotation of a shaft. For example, over 99% of all the electricity on Earth originates from an electric generator, and roughly two-thirds of that energy goes on to power conventional electric motors. For example, a majority of electric machines use radial flux motor design configurations due to its simplicity, whereas, when torque density is a most important motor design requirement, the types of motor configuration used is an axial flux motor.

Most conventional electric motors require pairing with speed-reducing transmission mechanism (such as a gearbox) when driving the loads for various applications. This is mainly due to two reasons: (a) typically electric machines are most efficient at its rated speed, which is usually a lot higher than the needed speed of the load; and (b) the direct torque output of the electric machines are usually not large enough for the application, and a transmission mechanism is needed to increase for torque. Such motor drive architecture including both the electric motor and the transmission mechanism are utilized in various application areas, such as machine tools, industrial machinery, home appliances, electric vehicles, etc.

However, the gearbox typically has nonlinear dynamics such as backlash hysteresis, nonlinear Coulomb friction, which can impair the electric motor's dynamic performance, and is not favorable for precision applications. To that end, in a number of other application areas, such as machine-room-less elevators, robot manipulators, precision rotary stages, and in-wheel drives for electric vehicles, it may be beneficial to eliminate this transmission mechanism, and directly drive the load with the electric motor.

For example, a conventional axial-flux permanent magnet motor designs are utilized for achieving a high torque density targeting the direct-drive motor applications. Such designs help to reduce axial length of the motor without loss of torque capability. Some efforts for improving conventional direct-drive motors have been on surface-mount permanent magnet (PM) motors, since these types of PM motors can have shear stress generation capability among various motor principles.

All electric machines, including the PM motors, can be categorized, according to their flux directions, into axial-flux machines and radial-flux machines. Most electric machines use radial flux due to its simplicity. For radial-flux machines, the magnetic field, or flux in the air gap between rotor and stator, runs radially with respect to the direction of the rotor. For axial-flux machines, the magnetic field, or flux in the air gap between rotor and stator, runs in the direction of the rotor shaft axis. However, for both types of machine designs, there is only part of a surface area along the stator is utilized as an air gap to generate torque One of the important conventional methods to try to improve the motor's torque by increasing an air gap surface area over the rotor's surface. The air gap is a distance between the rotor and stator. When extra torque generation is needed, one effective conventional method to increase the motor's torque is to use a combination of axial-flux and radial-flux for torque generation. In these cases, the air gaps are configured in both axial and radial directions, and the magnetic flux in the stator is three-dimensional.

A permanent magnet synchronous motor, like any rotating electric motor, consists of a rotor and a stator. The stator is a fixed part, and the rotor is a rotating part. Typically, the rotor is located inside the stator of the electric motor. There are also motor designs having structures with rotors located outside of the stator, i.e. inside out or external rotors, which are referenced as outer runner electric motors. Typically, for these types of outer runner electric motors, the rotor consists of permanent magnets consisting of materials with high coercive force for the permanent magnets. The stator consists of an outer frame and a core with windings, which is the most common designs with two-phase and three-phase windings. The principle of operation of a synchronous motor is based on an interaction of a rotating magnetic field of the stator and a constant magnetic field of the rotor. The magnetic field of the rotor is interacting with the synchronous alternating current of the stator windings, according to Ampere's Law, which creates torque, forcing the rotor to rotate.

Accordingly, there is a need for new motor design configurations including combined axial-flux and radial-flux motor designs and outer runner electric motor designs, to improve torque generation for direct drive motor applications without the need for a gearing box and allow for use of electrical liminations to assist in reducing loss and improve torque.

SUMMARY

The present disclosure relates to motor designs for motors including combined axial-flux and radial-flux motor and outer runner electric motors with direct-drive applications without a gear-box, and in particular, motors having stator cores with non-ferromagnetic materials to allow for electrical laminations which reduces loses and improves torque.

Some embodiments of present disclosure provide improved motor designs with direct-drive applications without gearboxes, that have stator assemblies with stator cores having non-ferromagnetic material. Replacing the conventional stator core materials, i.e. soft magnetic composite (SMC) or ferrite materials, with non-ferromagnetic material goes against conventional thinking and conventional designer beliefs. Test experimentation discovered that stator cores with non-ferromagnetic material can provide for allowing to have separate electrical-lamination-made stator yokes. These new motor designs with separation of the stator yoke allows for electrical lamination, proved to illustrate an increasing amount of a motor's torque and reduced an amount of a motor's hysteresis loss, among other benefits, when compared to a same size conventional motor having a monolithic stator and a core made of SMC or ferrite materials.

Embodiments of the present disclosure include stator cores with non-ferromagnetic materials such as plastic or fiberglass, and have separate stator yokes with a center volume of the stator core replaced the conventional SMC materials with non-ferromagnetic materials. Contemplated is that there can be specific shapes, patterns and layering of the non-ferromagnetic materials in the stator yokes or stator core, rather than just replacing the center volume of the stator core. Depending upon the motor designer specific goals and motor operational performance goals, the specific shapes, patterns and layering of the non-ferromagnetic materials in the stator core can be configured to assist obtaining and meeting those specific motor operational performance goals, such as maximizing a total torque output. Some advantages later realized from experimentation included that an amount of a motor's total weight is reduced by replacing an amount of the conventional heavier SMC materials with a corresponding amount of lighter non-ferromagnetic materials in the stator core. Thus, by reducing an amount of the motor's total weight, therefor translates to an increase amount of a motor's torque-to-mass ratio, when compared to an amount of a conventional motor's total torque of a same size conventional motor with stator cores with a monolithic soft magnetic composite (SMC) or ferrite materials.

Other innovative features realized from experimentation include incorporating a new winding approach that have been incorporated into some of the new motor designs of the present disclosure for motors including combined axial-flux and radial-flux motor and outer runner electric motor. For example, during experimentation there was a realization that the winding could be reevaluated, in view of incorporating the non-ferromagnetic materials in the stator core. Thus, after experimenting with different winding configuration, what was discovered is this innovative wrapping approach where the windings wrapped around the stator core in a pattern called toroidal winding which resulted in reducing an amount of length of end turns. At least one reason this is significant is that this innovative feature resulted in an increase in an amount of a motor's usage of end windings, and therefore, provided in an increase in an amount of the motor's efficiency, when compared to an amount of a conventional motor's usage of end windings using conventional winding practices and approaches of a same size conventional motor with a stator core with SMC or ferrite materials.

During experimentation, there were many challenges and problems to overcome to figure out how to incorporate and utilize conventional electrical laminations for three-dimensional (3-D) flux motors. The reason is that electrical laminations work only for 2-D flux motors, and do not work for 3-D flux motors. Thus, conventional thinking by conventional motor designers would not attempt to incorporate conventional electrical laminations for 3D motors, since it was conventional thought it could not be done. For example, conventional 3D flux motor designs have air gaps configured in both axial and radial directions, with a stator magnetic flux that is 3-D, and the conventional stator core is required to be made of soft magnetic composite (SMC) or ferrite materials. The reason the SMC material is required is in order to achieve low bulk conductivity, since eddy currents are generated in all directions, this prevents using electrical laminations for 3-D flux motors. Some problems using SMC or ferrite material for conventional stator cores, is that the SMC material reduces a motor's shear stress generation per unit air-gap area, due to the SMC material's lower permeability. Other problems using the SMC material include increases a motor's hysteresis loss, since the magnetic coercive force of the SMC material is higher than the electrical laminations, as noted above.

At least one realization to replace the conventional SMC materials with non-ferromagnetic materials (plastic or fiberglass) in the stator core, was because experimentation taught that when using a conventional monolithic stator core made of SMC material, resulted in a low magnetic flux density at the center of the stator core. Which meant that the center ferromagnetic material of the stator core was not fully utilized and led to the realization of replacing the center of the stator core with non-ferromagnetic material. Some aspects learned is that conventional stator cores made of SMC material increased the motor overall weight, reduced a motor's shear stress generation per unit air-gap area due to the material's lower permeability, and also increased the motor's hysteresis loss, as well as decreased the motor's overall torque. Based upon this realization, and after many test motor design configurations, the resulting motor designs of the present disclosure were later recognized as having many benefits including: (1) non-ferromagnetic stator core materials reduce mass of the motor without hurting motor's torque, and improves motor's specific torque (torque per unit mass); (2) electrical lamination for both radial and axial flux stator cores, provide lower material and manufacturing cost, higher torque, and lower loss; (3) toroidal windings allow single stator assembly and reduce end winding length, which allows for high efficiency; and (4) the improved motor configurations provides for an increase in an amount of a motor's flexible design to optimize an amount of torque density and/or an amount of specific torque, when compared to an amount of a conventional motor's flexible design to a same size conventional motor using a core with soft magnetic composite (SMC) or ferrite material.

The present disclosure includes an innovative stator assembly having many features, such that these features will be discussed in more detail, the features include having: (A) stator core material with non-ferromagnetic material; along with one or a combination of features including: (B) an separate electrical-lamination-made stator for the axial-flux stator yokes and radial-flux stator yokes; or (C) toroidal windings for the stator assembly.

A. Innovative Stator Cores Using Non Ferromagnetic Materials—Realization that a Type of Stator Core Material Improves a Motor's Performance Some embodiments are based on the recognition that for motor designs such as combined axial-flux and radial-flux motor designs and outer runner electric motor designs, a type of stator core material can negatively affect a motor's conductivity, resulting in reducing a motor's overall level of performance. From experimentation, what was discovered is that conventional monolithic stator cores made of soft magnetic composite (SMC) or ferrite materials, reduce a level of magnetic flux density at the center of the stator core. Based upon this discovery, this conventional flawed motor design added a higher overall total motor weight, which incidentally, is not good for many of today's motor applications, among other negative aspects. Thus, an improvement was realized to overcome the shortcomings of the flawed conventional motor design, by replacing the center of the conventional stator core with non-ferromagnetic materials such as plastic or fiberglass. This realization goes against all conventional motor designs and conventional thinking for conventional designers of these types of motors.

Conventional Combined Axial Flux and Radial Flux Motor Designs

Since conventional combined axial-flux and radial-flux motor designs were specifically designed to achieve an increase in torque density over other types of conventional motor designs. These conventional motor designs have air gaps configured on both axial-direction and radial-direction, and a magnetic flux in the stator is three-dimensional. The conventional stator core design includes soft magnetic composite or ferrite materials for obtaining low bulk conductivity, due to eddy currents that are generated in all directions. However, some negative effects for these types of conventional motor designs results in not being able to utilize conventional electrical laminations. Other negative aspects for these types of conventional motor designs with separated stators surrounding the rotor, include a lower specific torque (when compared to other same size conventional motor designs), due to the use of having a solid rotor. However, when these conventional type motor designs are compared with the embodiments with stator cores using non-ferromagnetic materials such as plastic or fiberglass, the motor performance results showed an increase in an amount of a motor's total torque, (C) Conventional Out-Runner Electric Motors Designs Since conventional out-runner electric motors designs have the rotor configured on an outside of the air gap and the stator assembly, the position of the stator assembly is inside in relation to the air gap and rotor. When compared with a conventional in-runner motor designs (i.e. where the stator is located on the outside in relation to air gap and rotor, such that the rotor is on the inside in relation to air gap and stator), of the same size; the present disclosure out-runner motor design increases a diameter amount of a radial-flux motor's air gap without changing a motor's overall dimension, and thus improves the motor's torque generation capability.

During experimentation a comparison between the physical and magnetic properties of two different SMC material and electrical lamination were conducted. What was learned is that the SMC materials have significantly lower permeability ($\mu r$) than the electrical lamination. In addition, the SMC material's magnetic coercivity ($H_c$) was larger than that of the electrical lamination. When comparing with conventional radial-flux motors with electrical lamination cores, motors with SMC cores had lower torque and higher hysteresis loss (definition next paragraph).

| Category | Material | $\mu_r$ | $H_c$ | Resistivity | Density |
|---|---|---|---|---|---|
| Lamination | M19 Electric Steel | 8000 | 56 A/m | 0.05 µΩm | 7650 kg/m3 |
| SMC | Somaloy 1000 3 P | 950 | 217 A/m | 70 µΩm | 7560 kg/m3 |
| SMC | Somaloy 130i 5 P | 350 | 152 A/m | 20000 µΩm | 7440 kg/m3 | where the permeability is ($\mu r$) and the magnetic coercivity is ($H_c$).

More experimentation followed that discovered conventional stator cores made of SMC or ferrite materials led to an amount of torque reduction and an amount of loss increase due to the stator yoke material. Other negative effects included a reduction in the test motor's shear stress generation per unit airgap area, which was believed due to the material's lower permeability, among other effects. Also, some test motors also suffered from lower permeability which meant that these test motors had a reduced magnetic stray field signature. In other words, having a low permeability material for a rotor can cause more magnetic field intensity to drop on the rotor core body and decrease the developed torque. In addition, the use of SMC for these types of motors also increased the motor's hysteresis loss, since the coercively of SMC were higher than conventional electrical laminations. Hysteresis loss can be caused by the magnetization and demagnetization of the core as current flows in the forward and reverse directions. As the magnetizing force (current) increases, the magnetic flux increases. In other words, a higher magnetic hysteresis loss of a motor is work done by the magnetizing force (current) against the internal friction of molecules of the magnet, which produces heat. This generated energy is wasted in the form of heat due to hysteresis, i.e. hysteresis loss, and is an undesirable process for the machines. For example, some reasons why hysteresis loss is undesirable is that an electrical overload for a motor can be caused by excessive voltage supply or overwork by drawing more current will lead to overheating issues. As the motor works harder or under unusual load, heat will be the chief by product, leading to failure.

As noted above, these conventional motor designs including conventional combined axial-flux and radial-flux motor designs and conventional out runner motor designs, have a large volume that is not fully utilized, i.e. a large fraction of the ferromagnetic core material of the stator is not utilized to guide the magnetic flux), and therefore is not beneficial for torque generation which resulted in a low torque-to-mass ratio, or specific torque, for the conventional motors.

Some other experimentation included tests on motors for torque reduction and loss increase due to core materials. Some test experiments used combined axial-flux and radial-flux motors with magnetic fluxes in the stator yoke that were three-dimensional. Under these test conditions for the test motors, eddy currents were generated in all directions in the stator yoke, and the stator core was made of soft magnetic composite (SMC) or ferrite materials in order to achieve low bulk conductivity. However, the conventional electrical lamination could not be used and thus these test motors were not able to fulfill the purpose. Because the electrical lamination could not be utilized for these test motor types, resulted in an amount of torque reduction and an amount of loss increase due to the stator yoke material. Upon further review of these results it was later realized that these same above effects were also experienced in conventional out runner motor designs.

Thus, experimentation furthered with a comparison between the physical and magnetic properties of two different SMC material and electrical lamination. What was learned, is that the SMC materials had significantly lower permeability ($\mu r$) than the electrical lamination. In addition, the SMC material's magnetic coercivity ($H_c$) were larger than that of the electrical lamination. When compared with conventional radial-flux motors with electrical lamination cores, the motors with SMC cores had lower torque and higher hysteresis loss. Another test experiment included testing the inefficient use of the core material. For example, when a test motor with combined axial-flux and radial-flux was tested, most often the magnetic flux could not penetrate the full volume of the stator or rotor core. Upon this finding, led to the above noted realization that there was an inefficient use of the core material, and also led to another realization that there was a relatively low torque-to-mass ratio, (i.e. this analysis was pertained to the conventional out runner motor designs).

B. Separate Electrical-Lamination-Made Stator Cores for Axial Flux and Radial-Flux Motor Designs and Out Runner Motor Designs Some embodiments are based on another recognition that a combined axial-flux and radial-flux motor design and out runner motor design could be configured to use stators having electrical laminations which would improve a level of a motor specific torque, when compared with the conventional combined axial-flux and radial-flux motor design or conventional out runner motor design that had stators not made of electrical laminations. As noted above, the conventional electrical laminations manufacturing processes cannot be used with conventional combined axial-flux and radial-flux motor designs and conventional out runner motor designs. For example, for conventional motor manufacturing with electrical laminations, have a thickness of the steel laminations usually between 0.014 or 0.025 inches. Thicker laminations are rare but thinner laminations are sometimes used for improved performance. First, each lamination needs to be processed from a blank sheet into a desired magnetic design. The most widely used conventional methods are punching, chemical etching and laser cutting. Then, these laminations need to be stacked together. Some of the conventional methods are riveting, bolting, welding, bonding and using dimples. For conventional motor designs with SMC cores, the material is not in a form of thin sheets. Therefore, the process to handle thin metal sheets as in the case of laminated motors cannot be used.

However, by replacing the stator cores made of SMC or ferrite materials for these types of motors, with non-ferromagnetic materials such as plastic or fiberglass, allowed for utilizing the conventional electrical laminations manufacturing the stators, in accordance with the present disclosure. This discovery led to the realization that a new motor design configurations including axial-flux and radial-flux motor designs and out runner motor designs, can have stator assemblies with separate axial-flux and radial-flux stator yokes and out runner stator yokes made with conventional electric laminations and later assembled together. This unique stator design provided for: (1) reducing an amount of the stator's manufacturing costs by being able to use the conventional electrical laminations; (2) increasing an amount of a motor's total torque due to the higher material permeability; (3) increasing an amount a motor's total specific torque (torque per unit mass); and also (4) has an amount of hysteresis loss that is lower, i.e. when compared with conventional motor designs having stator assemblies with stators not made with conventional electrical laminations for motors of the same size).

Some advantages of this unique stator design of the embodiments of the present disclosure can include an increase in an amount of torque generation area over a rotor's surface (i.e. the surface area between rotor and stator that can generate torque, when compared to an amount of torque generation area over the rotor's surface for the conventional combined axial-flux and radial-flux motor of the same size. Also, this unique stator design of the embodiments of the present disclosure can include an approximate constant shear stress generation in air gaps, that increases an amount of torque generation area without increasing a motor's overall cubic area/size, i.e. motor's total volume, that results in effectively improving an amount of a motor's torque density, when compared to an amount of torque generation area of a conventional same size motor's total volume of a same type of conventional motor of the same size.

Other benefits, among many benefits, for this innovative stator core design using a non-ferromagnetic materials as the center volume of the stator core effectively reduced a motor's total weight, and therefore improves the motor's torque-to-mass ratio, when compared to similar conventional motor designs of the same size. This is because non-ferromagnetic materials can have much lower density than ferromagnetic materials, and by replacing the ferromagnetic material of a same volume with lighter non-ferromagnetic materials, reduced an amount of an overall mass of the motor.

(C) Toroidal Winding Feature

Still another feature having some advantages of the present disclosure can include a toroidal winding feature that has a stator with a ring-shaped stator yoke with slots, and the winding is wrapped around a core forming a toroid-shaped stator assembly. The wrapping of the winding around the core has a pattern called toroidal winding. At least one use of toroidal winding of the present disclosure helps reduce a length of end turns, which in turn helps reduce a motor's copper loss, and thus improves an amount of a motor's overall efficiency, at least when compared with similar type conventional motors of the same size.

Some embodiments of the present disclosure are configured for direct drive applications, since direct-drive motors are attractive for many following reasons: (a) The elimination of gearbox can effectively reduce the volume of the actuator assembly, which makes the system more compact. (b) Gearbox fault is one of the major failure mode for geared motors, and the use of direct-drive motors is beneficial for reliability. (c) A simpler actuator assembly without gearbox can help reduce the system's cost. (d) Gearboxes typically have nonlinear dynamics such as backlash hysteresis, nonlinear Coulomb friction, which can impair the system's dynamic performance, and is not favorable for precision applications. These facts motivated a series of innovation in motor technology in order to realize motors for direct-drive applications. The direct-drive motors configured with the embodiments of the present disclosure can have some features, such as an amount of ultra-high torque generation capability that is higher, an amount of nominal speed that is lower, an amount of specific torque (torque per unit mass) that is higher, an amount of torque density (torque per unit overall volume) that is higher, an amount of relatively efficiency that is higher, an amount of torque ripple that is smaller, and an overall volume or a compact form factor that is smaller, when compared with conventional non-direct drive electric machines of the same size and type.

Some aspects of other test motor designs having a combined radial and axial-flux motor with a non-ferromagnetic core, included a structure that serves as a core for a stator winding. Some of these test motor designs had stator packets arranged to a common stator carrying structure rotor packets arranged to a common rotor carrying structure. Where the rotor packets were electromagnetically interacting with at least one of the stator packets. Further an inner rotor carrying structure and rotor packets were rotating between an outer stator carrying structure and the stator packets. Where at least one of the stator packets was arranged on each side of the rotor carrying structure, in radial direction for some test design motors, and in an axial direction for some other test design motors, and yet another set of test design motors further included at least one of the stator packets arranged at the periphery, in radial direction. For some of the test design motors the interacting stator and rotor packets were arranged so that magnetic flux in an air gap between the packets crosses the air gap predominantly in radial direction. Still, other test design motors included the interacting stator (12a-e) and rotor (14a-d) packets were arranged so that magnetic flux in an air gap between some of interacting packets crosses the air gap predominantly in radial direction.

However, what was later realized is that all these test motor designs had a functionality "with a motor that will not experience axial forces on the rotor in case of axial misalignment". Whereas, upon review of such test design motors, what was later learned was that both the structure and functionality were different. In contrast, to the embodiments of the present disclosure, the embodiments included a structure that had both shape and location that was different then the above test design motors, along with a center piece of the stator assembly the was also structured differently. Another difference that the embodiments of the present disclosure provided was a motor designed functionality having a reduced weight, a reduced loss along with providing further mechanical support, over the above test design motors.

According to an embodiment of the present disclosure, an electrical machine that is an axial-flux and radial-flux motor including a rotor mounted rotatably about a machine axis, with the rotor rotatively attached to a shaft. A stator assembly having a stator core with a non-ferromagnetic material and including a first axial-flux stator yoke having an inner wall rigidly attached on an outer surface of a first edge wall of the stator core. A second axial-flux stator yoke having an inner wall rigidly attached on an outer surface of a second edge wall of the stator core. Wherein the first and the second axial-flux stator yokes each include an outer wall with slots. A radial-flux stator yoke with slots includes a continuous inner wall rigidly attached on a continuous outer wall of the stator core. Wherein the radial-flux stator yoke and the first and the second axial-flux stator yokes include laminated sheets. Windings positioned in the slots of the first and the second axial-flux stator yokes and the radial-flux stator yoke.

According to another embodiment of the present disclosure, an electrical machine that is an axial-flux and radial-flux motor including a rotor mounted rotatably about a machine axis, with the rotor rotatively attached to a stationary shaft. A stator assembly including a stator core with a non-ferromagnetic material, the stator core including a first edge wall, a second edge wall and a continuous outer wall circumferentially positioned around the stator core. A first axial-flux stator yoke having an inner wall rigidly attached on an outer surface of a first edge wall of the stator core. A second axial-flux stator yoke having an inner wall rigidly attached on an outer surface of a second edge wall of the stator core. Wherein the first and the second axial-flux stator yokes each include an outer wall with slots. A radial-flux stator yoke with slots includes a continuous inner wall rigidly attached on a continuous outer wall of the stator core, wherein the radial-flux stator yoke and the first and the second axial-flux stator yokes include laminated sheets. Windings positioned in the slots of the first and the second axial-flux stator yokes and the radial-flux stator yoke. Wherein the stator assembly is fixed to the stationary shaft of which the rotor rotates around the same stationary shaft, in order to transmit a torque action to produce a torque force.

Another embodiment of the present disclosure an electrical machine that is an axial-flux and radial-flux motor including a rotor mounted rotatably about a machine axis. A stator assembly including a fixed non-ferromagnetic stator core attached to the shaft. A first axial-flux stator yoke and a second axial-flux stator yoke both having slots in an axial direction. A radial-flux stator yoke with slots is positioned on an outer diameter surface of the fixed non-ferromagnetic stator core. A set of toroid-shaped multiphase winding configured within the slots of the first and the second axial-flux stator yokes the radial-flux stator yoke. A two axial-flux rotor assembly rotatively attached to the shaft and engages with the first and the second axial-flux stator yokes. Each axial-flux rotor assembly includes an axial-flux rotor housing rigidly attached to an outer race of bearings, an axial-flux rotor back-iron attached to the axial-flux rotor housing, and an axial-flux permanent magnet array attached to the axial-flux rotor back-iron. A radial-flux rotor assembly rigidly connected to both axial-flux rotor housings, and rotatively engaged with a radial-flux stator yoke, the radial-flux rotor assembly has a radial-flux rotor housing rigidly attached to the both axial-flux rotor housings, a radial-flux rotor back-iron attached to the radial-flux rotor housing, and a radial-flux permanent magnet array attached to the both axial-flux rotor back-irons.

Another embodiment of the present disclosure a system including a transceiver to receive signals from sensors associated with an axial-flux and radial-flux (AFARF) motor. A digital controller configured to receive the signals and generate control signals specifying values of one or combination of a multi-phase voltage or a current for the AFARF motor, for tracking a reference trajectory of torques of the AFARF motor. Wherein the AFARF motor has a load whose position is controlled by the AFARF motor and is controllable by the digital controller. Wherein the AFARF motor includes a rotor mounted rotatably about a machine axis, with the rotor rotatively attached to a shaft. A stator assembly having a stator core with a non-ferromagnetic material and including a first axial-flux stator yoke having an inner wall rigidly attached on an outer surface of a first edge wall of the stator core. A second axial-flux stator yoke having an inner wall rigidly attached on an outer surface of a second edge wall of the stator core. Wherein the first and the second axial-flux stator yokes each include an outer wall with slots. A radial-flux stator yoke with slots includes a continuous inner wall rigidly attached on a continuous outer wall of the stator core. Wherein the radial-flux stator yoke and the first and the second axial-flux stator yokes include laminated sheets. Windings positioned in the slots of the first and the second axial-flux stator yokes and the radial-flux stator yoke that form a toroid-shaped stator assembly. An inverter in communication with the digital controller and the AFARF motor, is configured to supply the multi-phase voltage and the current generated according to the generated control signals to multi-phase windings of the AFARF motor to reduce an error between the reference trajectory and a measured torque of the AFARF motor, if the error is above a predetermined error threshold.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 9A illustrates a Type I motor, and FIG. 9B illustrates a Type II motor, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates generally to motors, and more specifically to a motor configuration with a combined axial-flux and radial-flux that uses separate electrical-lamination-made stator cores for the axial-flux and radial-flux that reduces loss and improves torque.

Figure 1A:
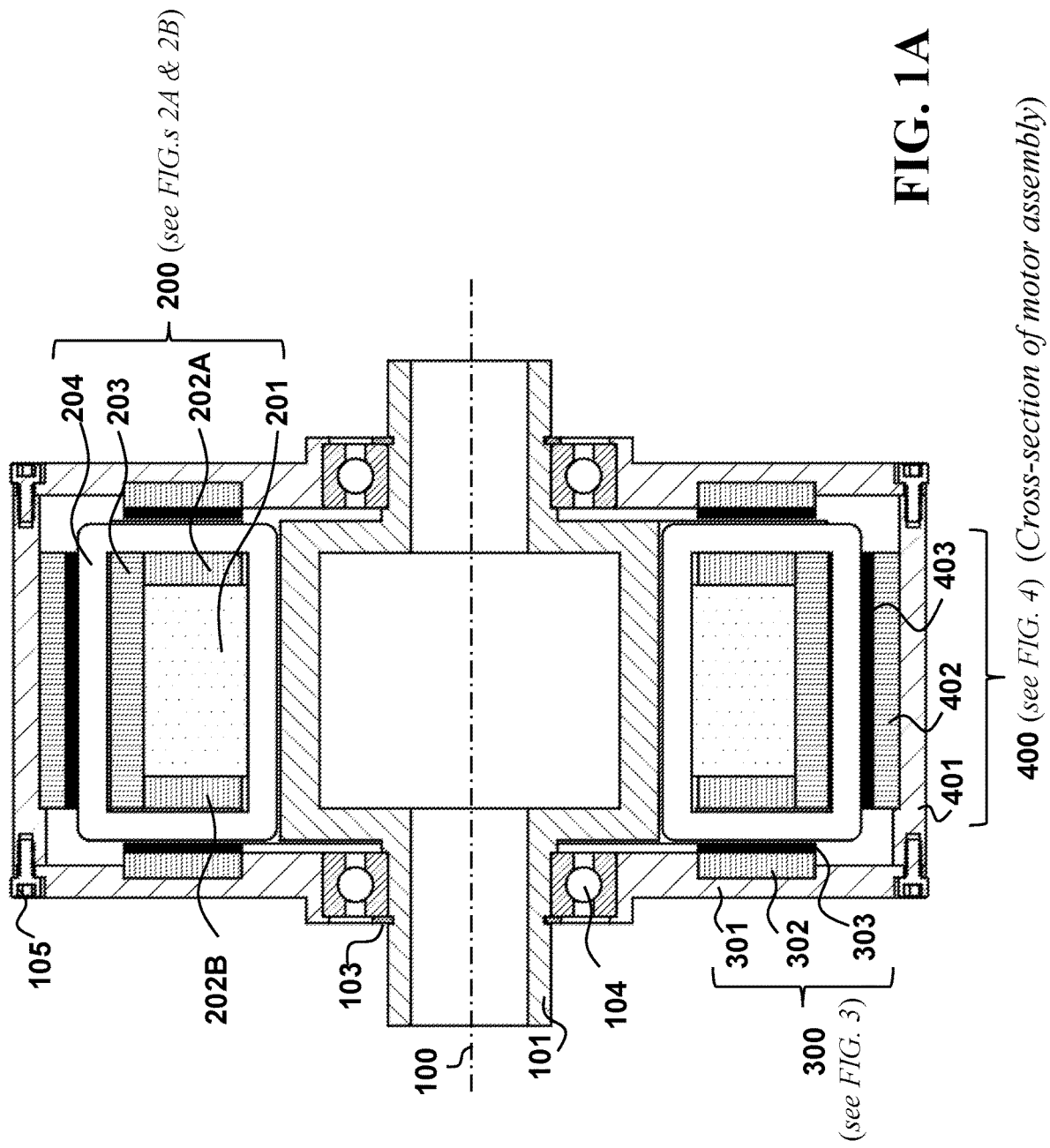
FIG. 1A is a schematic diagram illustrating a cross-section view of a motor, according to an embodiment of the present disclosure.

FIG. 1A is a schematic diagram illustrating a cross-section view of a motor, according to an embodiment of the present disclosure. The motor design of the present disclosure includes a combined axial-flux and radial-flux design for torque generation, that can be applied with direct-drive applications. For example, a shaft 101 is a stationary motor shaft, and line 100 is a rotational axis of a rotor.

A stator assembly 200 (see FIG. 2A & FIG. 2B for more detail) is in a center of the whole machine and the stator assembly 200 fixed on the shaft 101. Wherein the stationary motor shaft 101 can be a hollow stationary motor shaft (see 599 of FIG. 5). The stationary motor shaft 101 can have an internal surface in the stationary shaft that can be used as a cooling channel, where cooling liquid can run through and take away the heat generated in the motor. Each stator assembly 200 can include at least one fixture core 201 made of non-ferromagnetic material, two axial-flux stator yokes 202A, 202B, one radial-flux stator yoke 203, and a set of stator winding 204.

Two axial-flux rotor assembly 300 and one radial-flux rotor assembly 400 are configured surrounding the stator assembly 200 and are free to rotate about the rotational axis 100. Here, each axial-flux rotor assembly 300 consists of one axial-flux rotor housing 301, one axial-flux rotor back-iron 302, and one axial-flux permanent magnet (PM) array 303. The radial-flux rotor assembly 400 consists of one radial-flux rotor housing 401, one radial-flux rotor back-iron 402, and one radial-flux PM array 403. The two rotor assemblies 300 and 400 are rigidly connected via screw fasteners 105 and are supported by bearings 104. The axial position of the bearings 103 are determined by retaining rings 103.

Figure 2A:
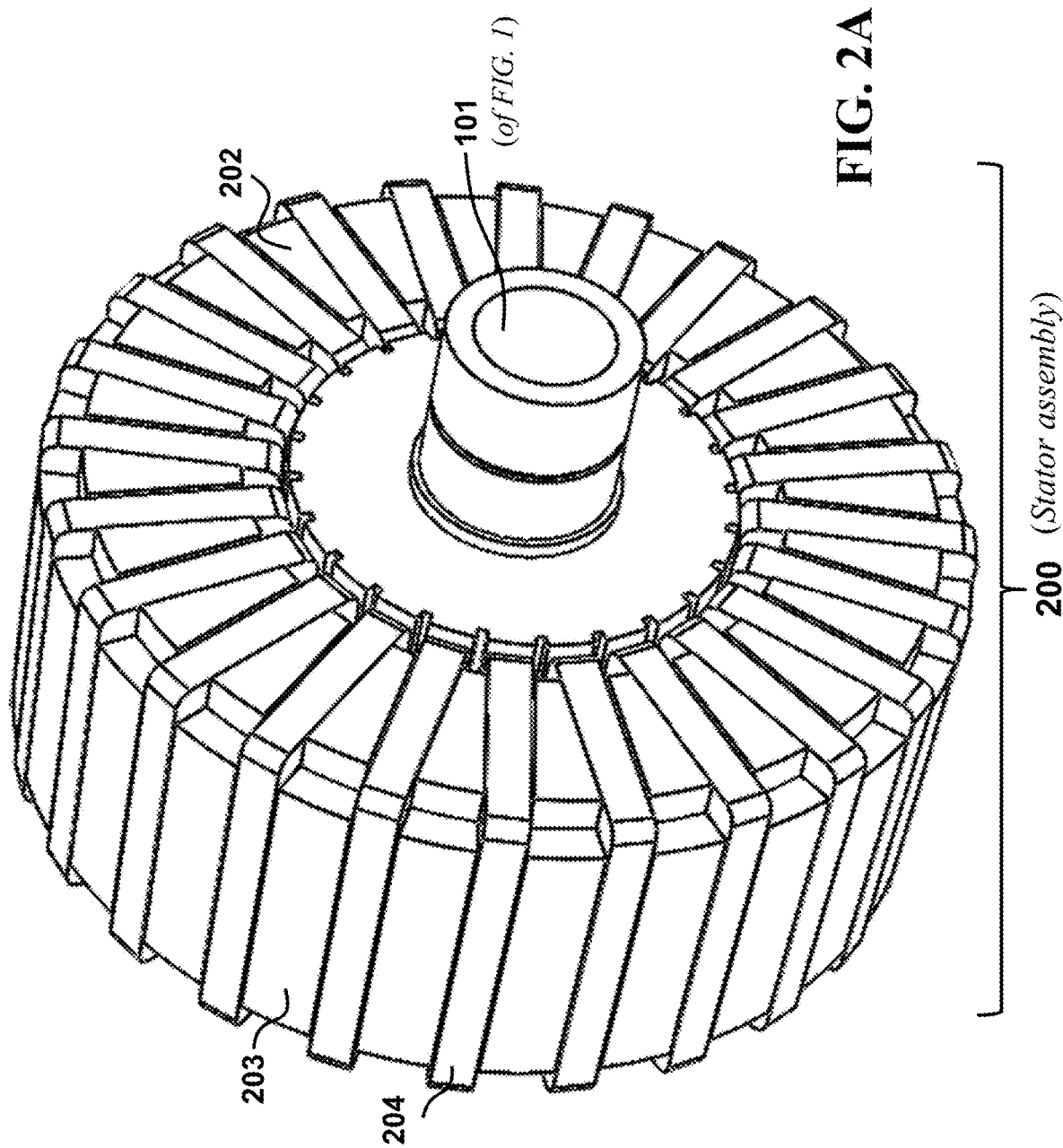
FIG. 2A is a schematic illustrating a motor stator assembly including an isometric view of the motor stator assembly, according to some embodiments of the present disclosure.

FIG. 2A is a schematic illustrating a motor stator assembly including an isometric view of the motor stator assembly, according to some embodiments of the present disclosure.

Figure 2B:
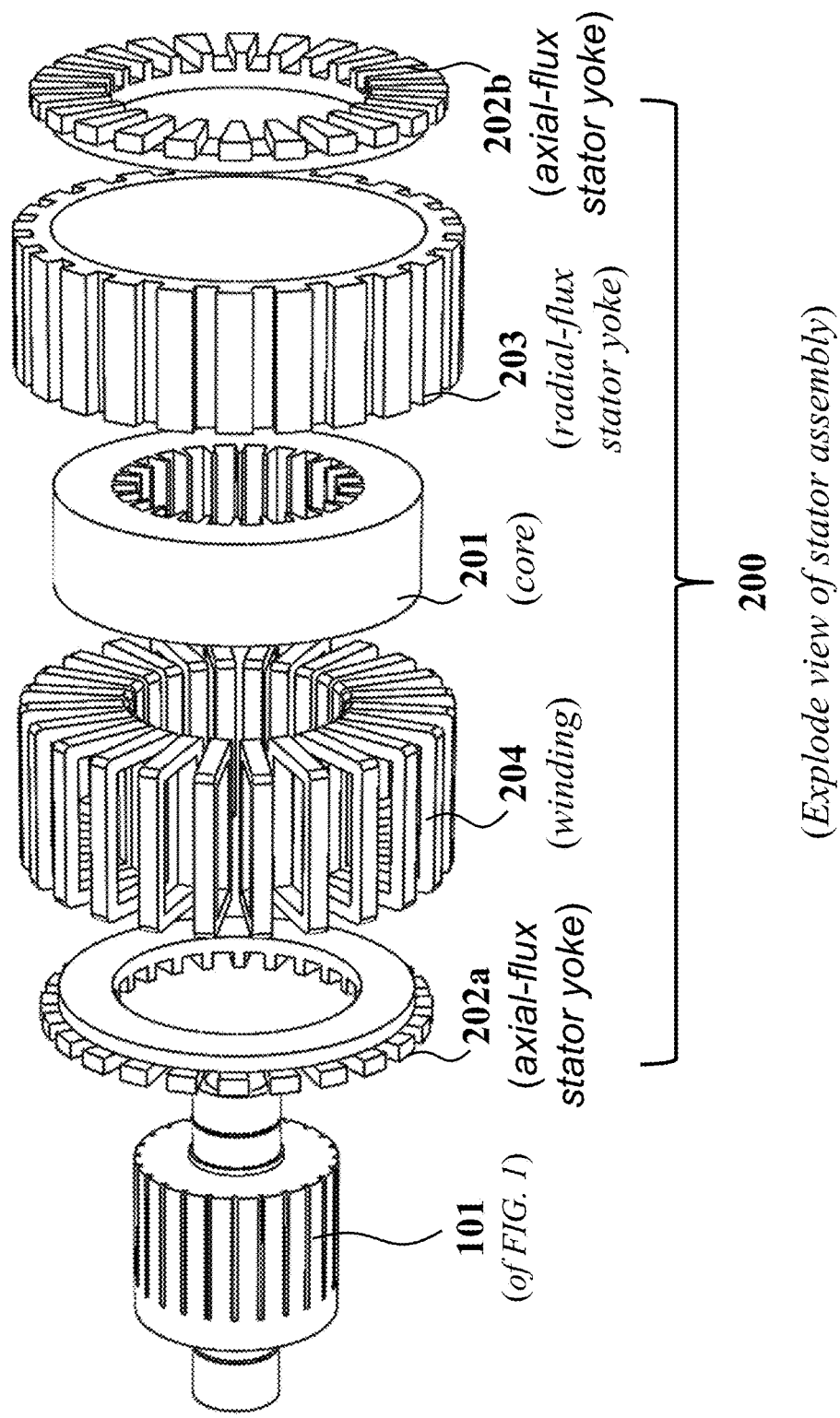
FIG. 2B is a schematic illustrating the motor stator assembly of FIG. 2A including an exploded view of the motor stator assembly, according to some embodiments of the present disclosure.

FIG. 2B is a schematic illustrating the motor stator assembly of FIG. 2A including an exploded view of the motor stator assembly, according to some embodiments of the present disclosure.

Referring to FIG. 2A and FIG. 2B, the fixture core or at least one core 201 is made of non-ferromagnetic material with low conductivity, for example fiberglass. It has slots on the inner-diameter surface. One radial-flux stator yoke 203 and two axial-flux stator yokes 202a and 202b are rigidly attached on the fixture core 201 via structural bonding adhesive. The axial-flux stator yoke 202 is made of spiral electrical lamination, where the laminated direction is in the radial direction. The axial-flux stator yoke 202 can be fabricated by making the disk-shaped spiral and then slots are cut via electrical discharge machining (EDM). One radial-flux stator yoke 203 is made of electrical lamination stacks, and the lamination direction is in the axial direction. The stator winding 204 is finally wound surrounding the assembled stator yoke (including 201, 202, and 203) in the slots. The stator winding 204 is made of multiple loops of magnetic copper wires, and are having three-phases and a pole pair number Ps. Finally, the stator assembly 200 is attached onto the shaft 101 and is rigidly connected via a spline, where the teeth on the inner surface of 201 are engaging with the slots on the surface of the shaft 101. In this way, the stator assembly 200 can be fixed on the shaft and large torque can be transmitted.

Figure 3:
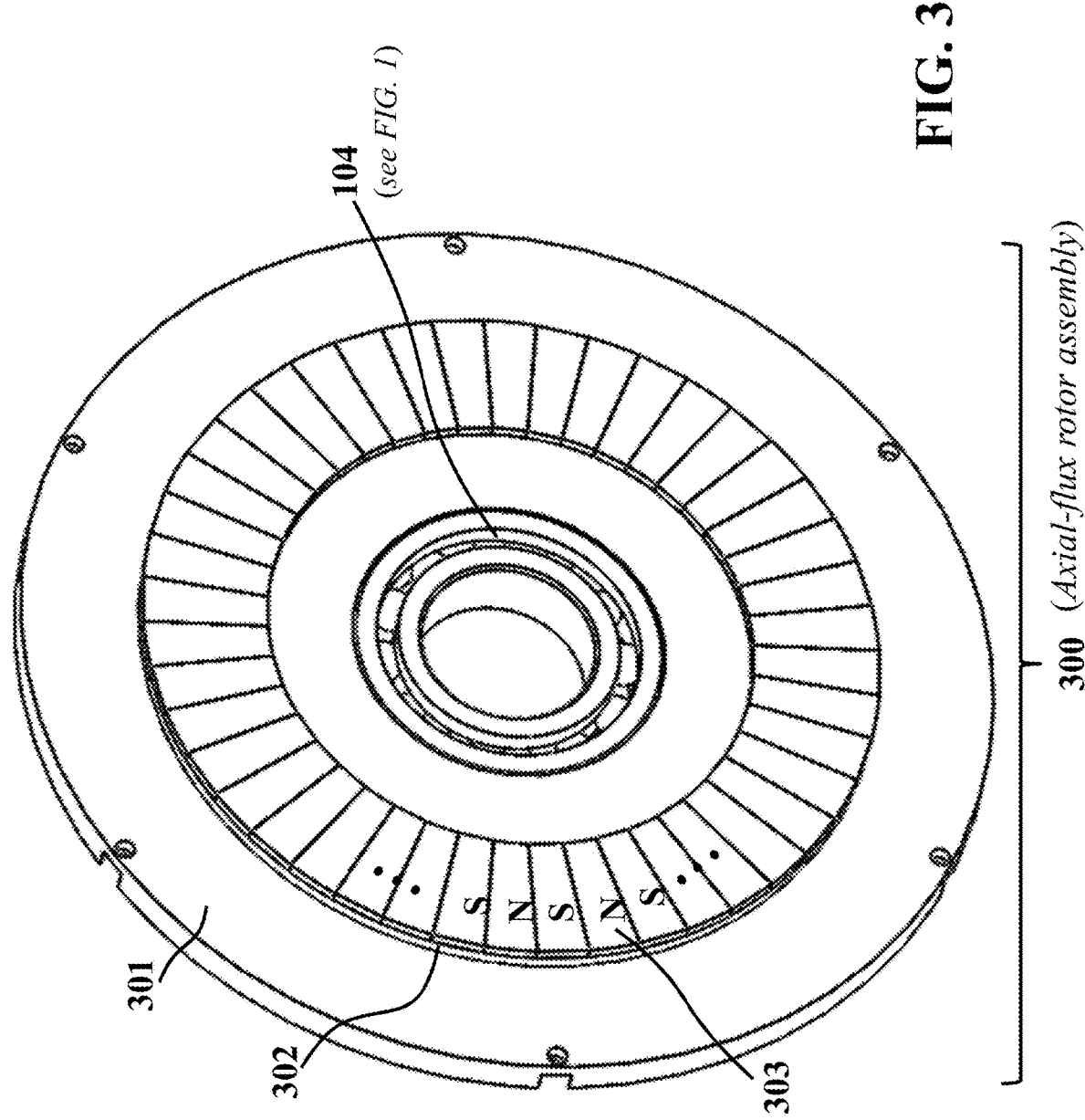
FIG. 3 is a schematic illustrating an axial-flux rotor assembly, according to some embodiments of the present disclosure.

FIG. 3 is a schematic illustrating an axial-flux rotor assembly, according to some embodiments of the present disclosure. For example, FIG. 3 shows the axial-flux rotor assembly 300 for the motor of the present disclosure, that can include one axial-flux rotor housing 301, one axial-flux rotor back-iron 302, and one axial-flux PM array 303. The axial-flux rotor backiron is made of spiral electrical lamination, where the laminated direction is in the radial direction. The axial-flux PM array 303 consists of 2Pr pieces of arc-shaped magnets with alternating polarity, where Pr is the number of rotor pole pair. The magnets are rigidly attached on axial-flux rotor backiron 302 via structural adhesive. The axial-flux rotor housing 301 can be made of structural aluminum alloy. The assembled 302 and 303 are fixed on the axial-flux rotor housing 301 also via structural adhesive.

Figure 4:
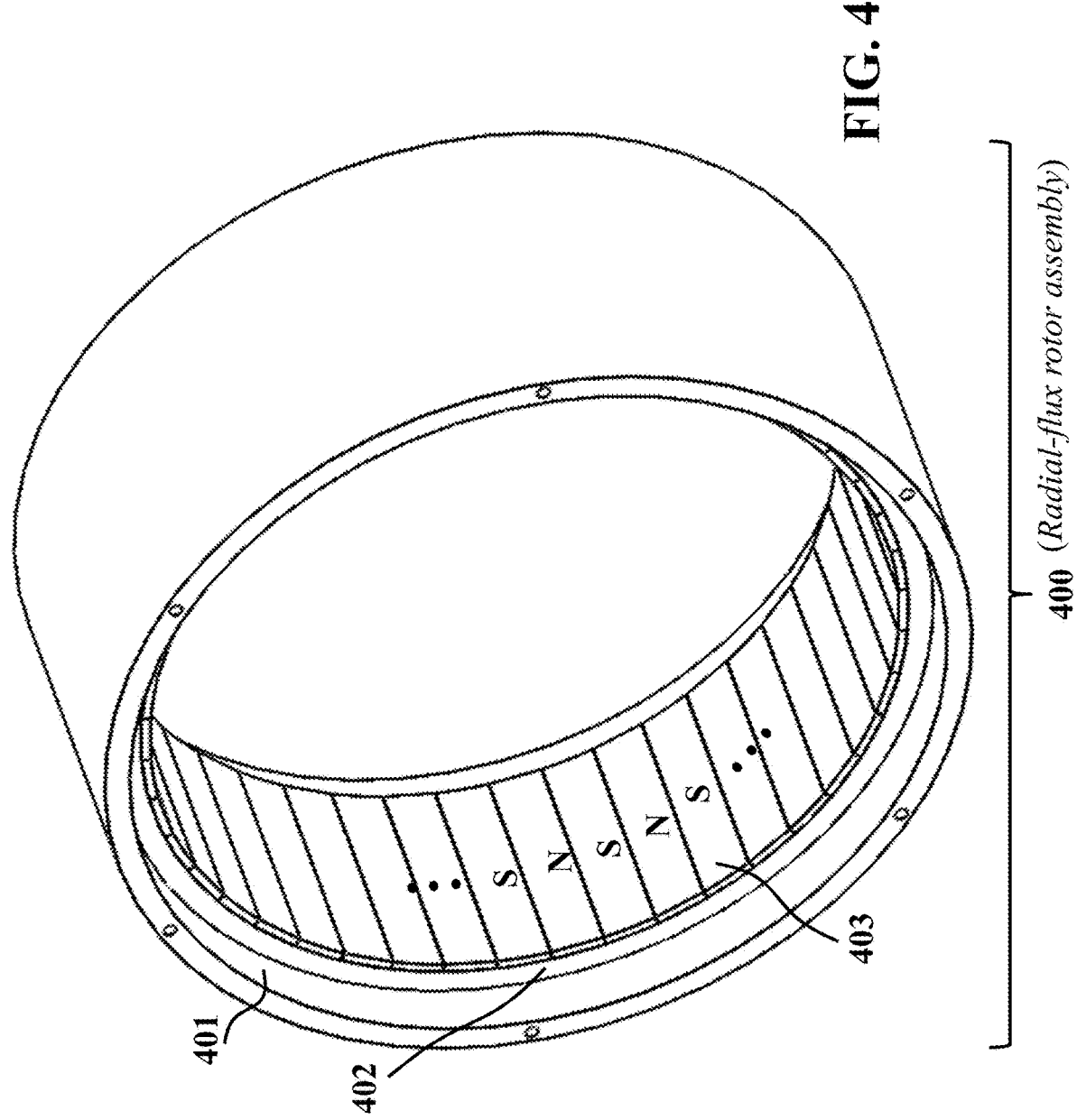
FIG. 4 is a schematic illustrating an radial-flux rotor assembly, according to some embodiments of the present disclosure.

FIG. 4 is a schematic illustrating an radial-flux rotor assembly, according to some embodiments of the present disclosure. For example, FIG. 4 shows the radial-flux rotor assembly 400 for a motor of the present disclosure, which that can include one radial-flux rotor housing 401, one radial-flux rotor backiron 402, and one radial-flux PM array 403. The radial-flux rotor backiron can be made of a stack of electrical lamination pieces, where the laminated direction can be in an axial direction. The radial-flux PM array 403 also can include of 2Pr pieces of arc-shaped magnets with alternating polarity. The magnets are rigidly attached on radial-flux rotor backiron 402 via structural adhesive. The radial-flux rotor housing 301 can be made of structural aluminum alloy, and taped holes are arranged on the axial-directional surfaces. Finally the assembled 402 and 403 are fixed to the radial-flux rotor housing 301 via press-fitting.

When exciting the stator coils with three-phase currents, the stator generates an rotating magnetic field, which integeracts with the rotor magnetic field and thus generate a torque to the rotor, which can accelerate the rotor or drive loads. When the motor design is having $$P_r = P_s, \quad (1)$$

the motor forms a regular surface-mount permanent magnet synchronous motor (PMSM).

When the motor parameters have relationship $$P_r = Z_s \pm P_s, \quad (2)$$

where Zs is the number of stator slots in 202 and 203, the motor forms a vernier permanent magnet motor (VPM), where both the fundamental harmonic air gap flux and the stator teeth harmonic air gap flux are involved in the torque generation. This motor is utilizing the magnetic gearing effect and thus enable larger torque generation comparing with the regular PMSM. The motor topology in this invention can be used in both regular PMSM and VPM motors.

Figure 5:
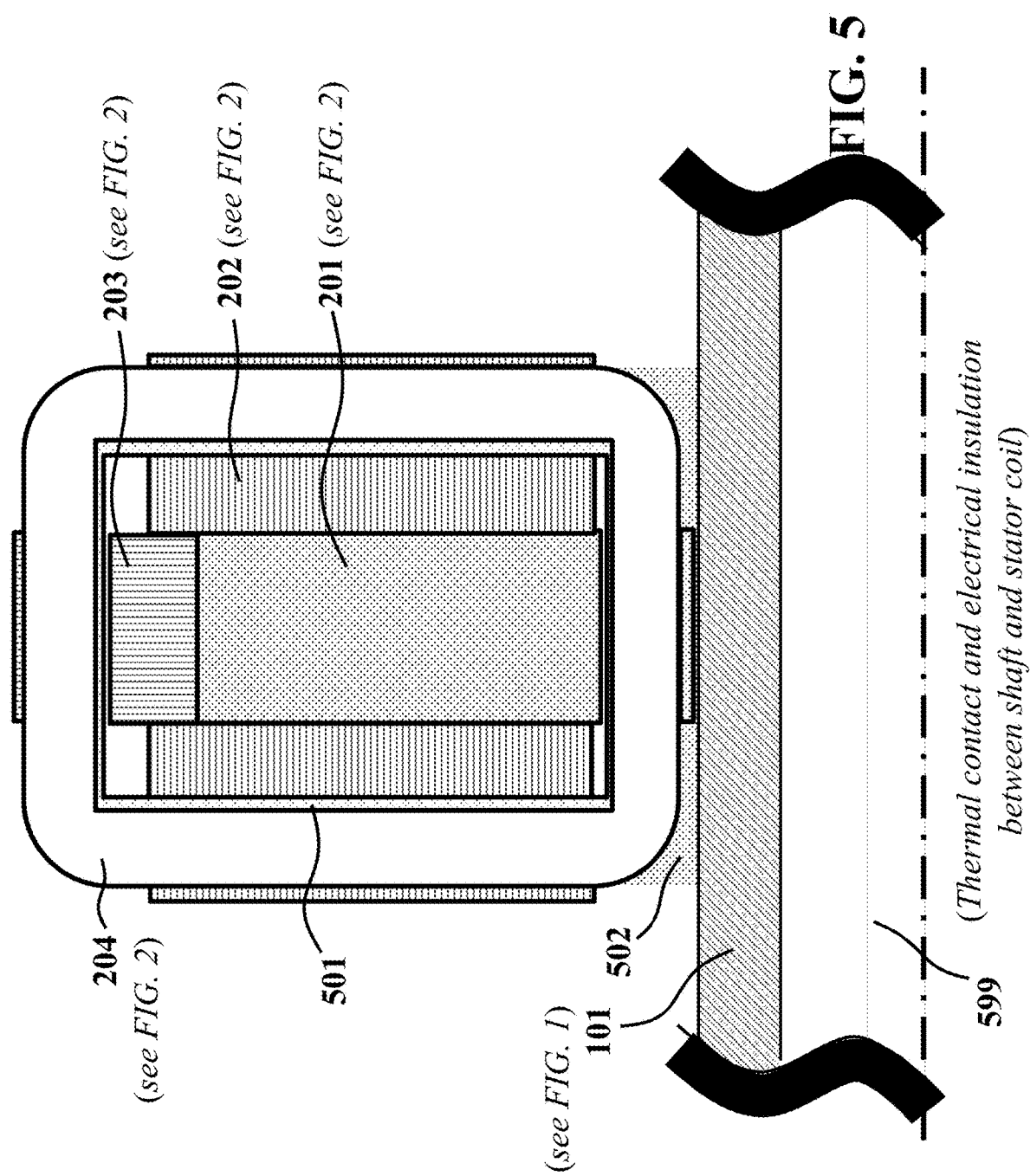
FIG. 5 is a schematic illustrating a thermal connection between motor stator assembly and a hollow shaft for cooling, according to some embodiments of the present disclosure.

FIG. 5 is a schematic illustrating a thermal connection between motor stator assembly and a hollow shaft for cooling, according to some embodiments of the present disclosure. For example, FIG. 5 shows the stator coils 204 are wrapping around the assembled stator yoke 201, 202 and 203 inside the slots. A thin layer of electrical insulator 501 is configured in between the stator yoke 201 and the stator coil 202. The insulator 501 can be made of polymide film or other standard slot insulation material for electric machines. After the stator assemblies are well positioned on the shaft, the stator coils 202 are in contact with the shaft 101 via a thermally conductive yet electrically insulating epoxy 502. This epoxy layer 502 can effectively conduct the heat from the coils into the shaft, and further into the cooling channels 599.

Figure 6:
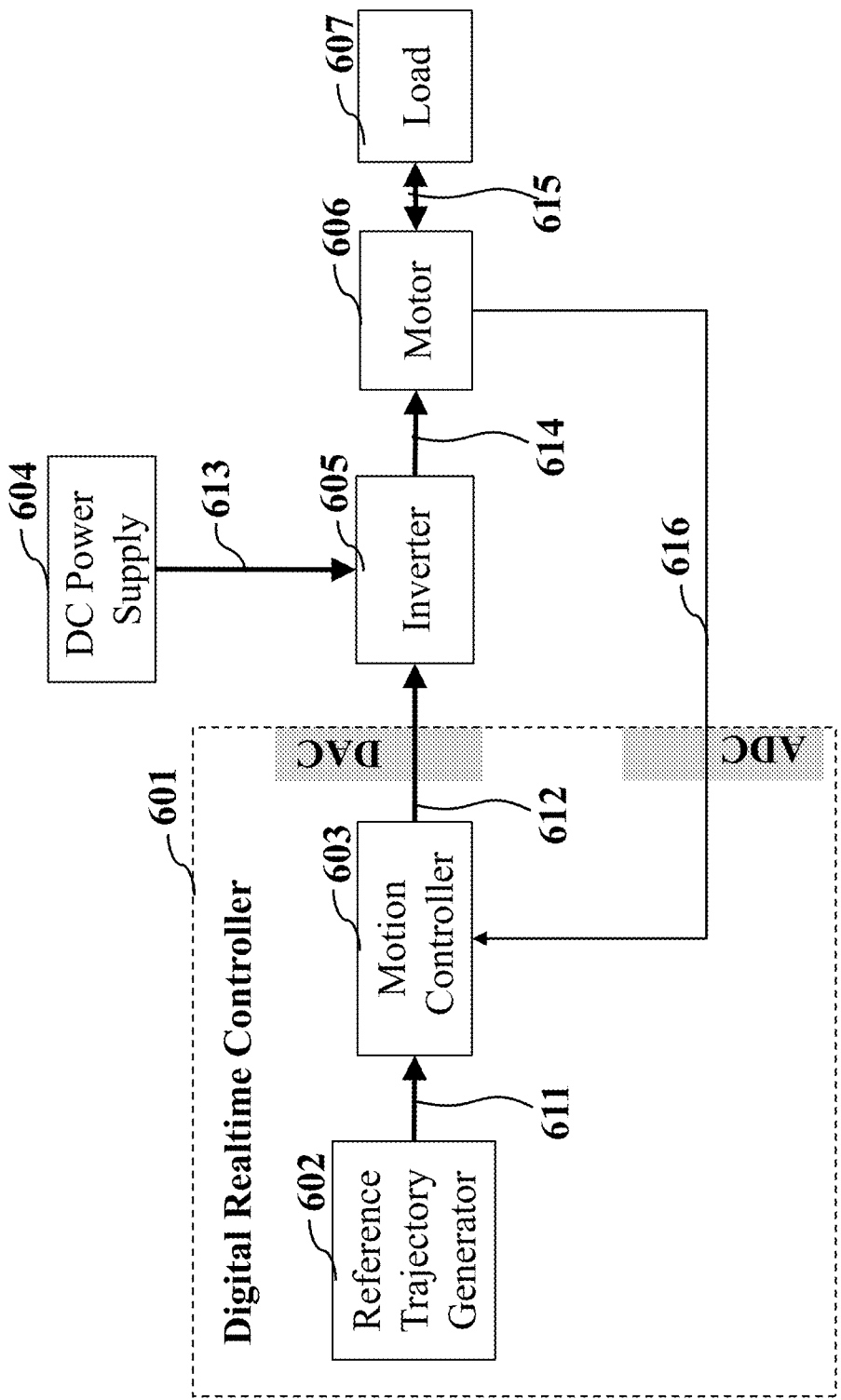
FIG. 6 is a block diagram illustrating a motor drive and control system, according to some embodiments of the present disclosure.

FIG. 6 is a block diagram illustrating a motor drive and control system, according to some embodiments of the present disclosure. For example, 6 shows a block diagram of the control system for the invented motor. The invented motor 606 is connected with the load 607 through connection 615. The motor's angular position was measured by a position sensor (not shown), such as encoder and hall-effect sensor, and the measured angular position signal 616 was fedback into the analog/digital converter of the digital realtime controller 601. The reference trajectory signal 611 is generated by the reference trajectory generator 602. Both the motor's measured position 616 and the reference trajectory 611 are fed into the motion controller 603, which generates a control effort signal 612 in the form of digital PWM signals. A DC power supply 604 generates a high-voltage DC power 613 which supplies the DC bus for the invertor 605. The PWM signal 612 controls the gates in the inverter 605, which generates high-voltage signals 614 and energize the winnings in the motor 606. With such control system, the motor's position can be controlled to follow the reference trajectory.

Figure 7:
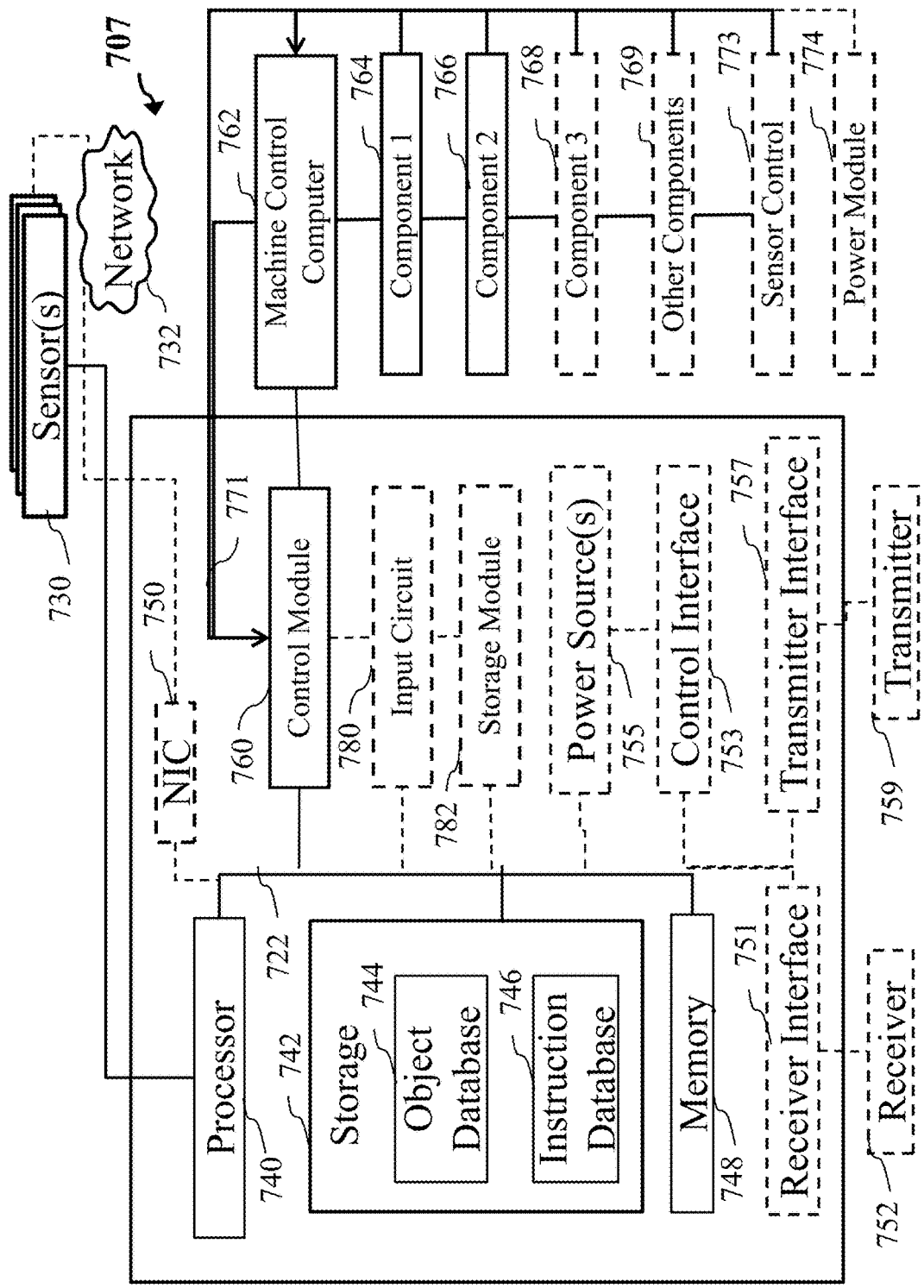
FIG. 7 is a schematic diagram illustrating some components for a processor in communication with a controller system of a machine including an induction motor, according to some embodiments of the present disclosure.

FIG. 7 is a schematic diagram illustrating some components for a computing system 707 having a processor 740 connected to a control system 762 of a machine (not shown), such as a PM machine or similar type of machine, according to some embodiments of the present disclosure. For example, the processor 740 can be located approximate the machine (not shown) or within the machine. The processor 740 can be connected to sensors 730 located within an environment (not shown) and positioned within a sensing distance of the processor 740 and the machine (not shown). The sensors 730 can be cameras, video cameras, speed sensors, light sensors, environmental related sensors (i.e. temperature, humidity, fire, air, water, barometer sensors, etc.), used with the machine (not shown). The sensors 730 can be hardwired and/or wireless, such that a network 732 can be within an operating distance range of the sensors 730.

The processor 740 is connected to a bus system 722 that connects to storage 742. The storage 742 can include a database 744, an instruction database 746, an historical database (not shown), an instruction historical database (not shown), an environmental database (not shown), a machine database (not shown) associated with the operation of the machine, other databases (not shown) can have data related to operation and information usable for optimizing, managing or operating the machine (not shown). Again, depending upon each user/operator's specific operational configurations/structure/special needs/sensitivities of the intended use of the machine, many different configurations are contemplated.

Still referring to FIG. 7, a memory 748 is connected to the bus system 722, along with a receiver interface(s) 751, a receiver(s) 752 and a power source(s) 755. The power source(s) 755 can be connected to the bus system 722, connected to a control interface 753, or be configure to have a multitude of other configurations, all of which, is contemplated depending on the specific user/operator intended specific needs for operations. It is possible the power source(s) can be electric, renewable energy sources, chemical, as well as directly connected to the machine, have a multiple external power sources of different types, or both. A transmitter interface(s) 757 and transmitter(s) 759 are connected to the bus system 722. Also, a network interface controller 750 (NIC, also known as a network interface card, network adapter, LAN adapter or physical network interface, and by similar terms, is a computer hardware component connecting a computer to a computer network) is connected to the bus system 722 and can be in communication with a network 732 or other different types of wireless networks (not shown). Again, depending upon the special needs for operation & sensitives needed by a user/operator for their intended use.

A control module(s) 760 can be connected to the bus system 722. The control module(s) 760 can be connected to a machine control computer(s) 762, that assist in directing components of the machine control computer 762. Some components can include, by non-limiting example, component 1 764, component 2 766, component 3 768, and other machine related components 769, which all can be connected to the machine control computer(s) 762, and/or the control module 760, via 771. The control Module 760 can be configured from the machine control computer 762 to check a machine component(s) status once, and report back, thereby providing management of the machine, operational optimization/performance along with other related service and monitoring capabilities. Contemplated is that the machine control computer can have a power module 774, that can include any power source that provides power to the machine (not shown) such as a power adaptor or a rechargeable battery pack depending on the user specific requirements.

Still referring to FIG. 7, the processor 740 can implement or execute stored instructions that are stored in memory 748, storage 742 or access from a cloud storage via the network 732, in particular, the processor 740 can access the prestored data including data from the database 744, the instruction database 746, or other stored data from other databases (not shown), as noted above.

Still referring to FIG. 7, the machine control computer 762 provide commands and implement changes to one or more components of the machine associated with aspects of the models of the present disclosure. Contemplated is that the computer system 707 can include a sensor control 773 connected to the components 764, 766, 768 of the machine. Also contemplated is that some component sensors (i.e. sensors associated with the machine, or any other components of the machine or associated with components associated with the machine), and other components (not shown) can be utilized. Contemplated is that multiple types of sensors can be located on or in an approximate area of the machine.

The sensor control computer 773 can include a hardware processor (not shown) connected a memory (not shown) that includes stored software (not shown). The hardware processor (not shown) can implement or execute stored instructions that are stored in memory (not shown), and when any sensor data is received, the received data can be compared to stored data, and send sensor data/signals, such warning messages, a level of performance associated with one or more components of the machine, etc., to the machine control computer 762 or other components of the machine or computer system 707. Another aspect of the systems and components of the present embodiments are that software or hardware, or some combination thereof, can be implemented via localized storage or through a cloud-based system.

Further, the control or controller module 760 can include different applications and programs for implementing methods of the present disclosure. For example, the control module 760 can include applications for processing information received from the machine control computer 762, such as generating graphs, operation related models including 3D models of the environment where the machine is located. The control module 760 can include applications for interpreting control inputs, or input signals, received via the input circuit/interface module 780, storage module 782, and generating commands/actions.

Figure 8:
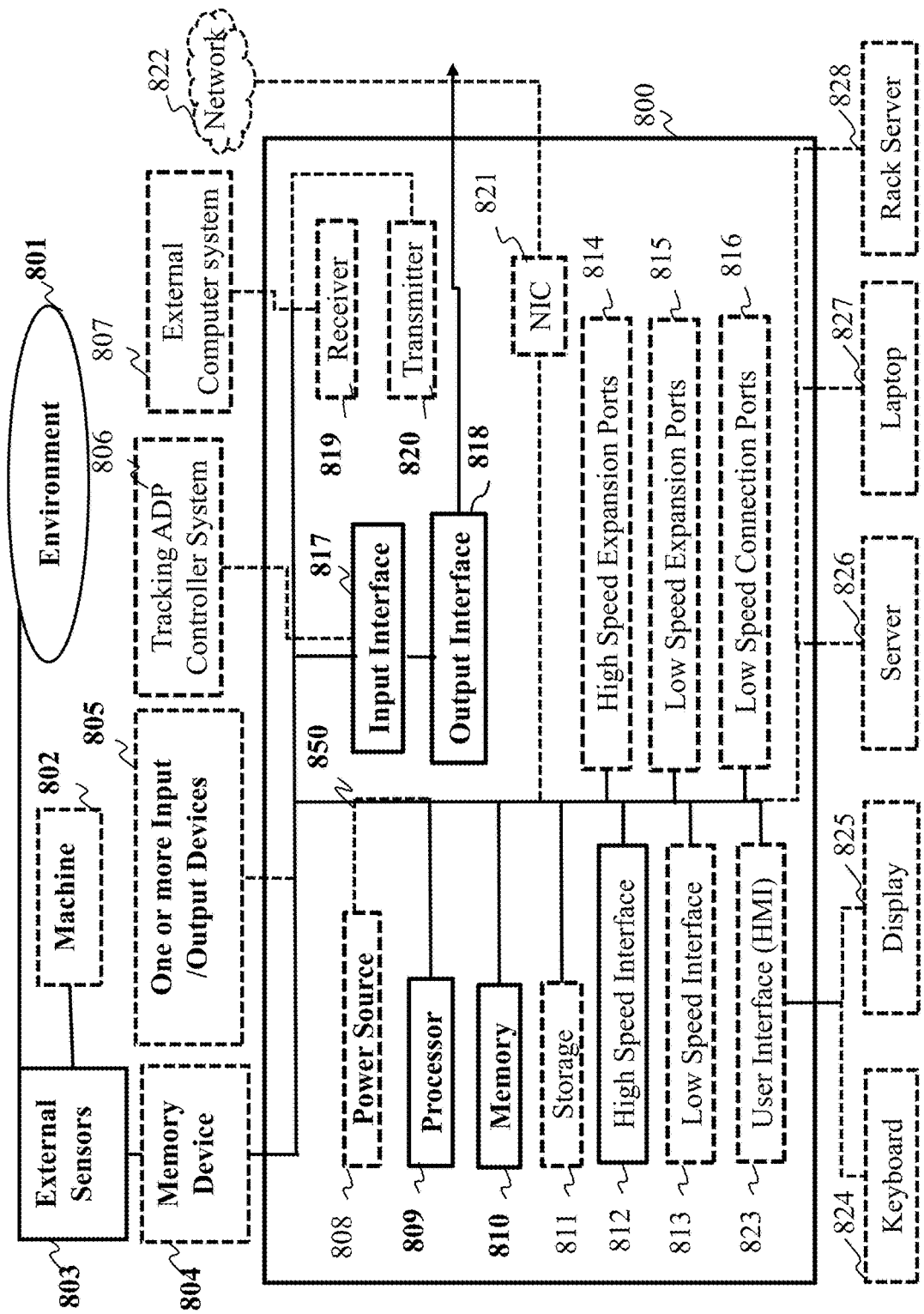
FIG. 8 is a schematic diagram illustrating a centralized controller system that can be used for implementing some systems and methods, according to some embodiments of the present disclosure.

FIG. 8 is a schematic diagram illustrating a centralized controller system that can be used for implementing some methods or may be combined with the processor of FIG. 7, depending on the specific goals of a user, according to some embodiments of the present disclosure. For example, the centralized controller system can be a computing apparatus that represents various forms of digital computers, such as laptops, desktops, workstations, personal digital assistants, servers, blade servers, mainframes, and other appropriate computers.

The centralized controller system 800 can include a power source 808, a processor 809, a memory 810, a storage device 811, all connected to a bus 850. Further, a high-speed interface 812, a low-speed interface 813, high-speed expansion ports 814 and low speed connection ports 815, can be connected to the bus 850. Also, a low-speed expansion port 816 is in connection with the bus 850. Contemplated are various component configurations that may be mounted on a common motherboard, by non-limiting example, 830, depending upon the specific application. Further still, an input interface 817 can be connected via bus 850 to an external receiver 806 and an output interface 818. A receiver 819 can be connected to an external transmitter 807 and a transmitter 820 via the bus 850. Also connected to the bus 850 can be an external memory 804, external sensors 803, machine(s) 802 and an environment 801. Further, one or more external input/output devices 805 can be connected to the bus 850. A network interface controller (NIC) 821 can be adapted to connect through the bus 850 to a network 822, wherein data or other data, among other things, can be rendered on a third-party display device, third party imaging device, and/or third-party printing device outside of the computer device 800.

Contemplated is that the memory 810 can store instructions that are executable by the centralized controller system 800, historical data, and any data that can be utilized by the methods and systems of the present disclosure. The memory 810 can include random access memory (RAM), read only memory (ROM), flash memory, or any other suitable memory systems. The memory 810 can be a volatile memory unit or units, and/or a non-volatile memory unit or units. The memory 810 may also be another form of computer-readable medium, such as a magnetic or optical disk.

Still referring to FIG. 8, a storage device 811 can be adapted to store supplementary data and/or software modules used by the computer device 800. For example, the storage device 811 can store historical data and other related data as mentioned above regarding the present disclosure. Additionally, or alternatively, the storage device 811 can store historical data like data as mentioned above regarding the present disclosure. The storage device 811 can include a hard drive, an optical drive, a thumb-drive, an array of drives, or any combinations thereof. Further, the storage device 811 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 809), perform one or more methods, such as those described above.

The system can be linked through the bus 850 optionally to a display interface or user Interface (HMI) 823 adapted to connect the system to a display device 825 and keyboard 824, wherein the display device 825 can include a computer monitor, camera, television, projector, or mobile device, among others.

Still referring to FIG. 8, the centralized controller system 800 can include a user input interface 817 adapted to a printer interface (not shown) can also be connected through bus 850 and adapted to connect to a printing device (not shown), wherein the printing device can include a liquid inkjet printer, solid ink printer, large-scale commercial printer, thermal printer, UV printer, or dye-sublimation printer, among others.

The high-speed interface 812 manages bandwidth-intensive operations for the computing device 800, while the low-speed interface 813 manages lower bandwidth-intensive operations. Such allocation of functions is an example only. In some implementations, the high-speed interface 812 can be coupled to the memory 810, a user interface (HMI) 823, and to a keyboard 824 and display 825 (e.g., through a graphics processor or accelerator), and to the high-speed expansion ports 814, which may accept various expansion cards (not shown) via bus 850. In the implementation, the low-speed interface 813 is coupled to the storage device 811 and the low-speed expansion port 815, via bus 850. The low-speed expansion port 815, which may include various communication ports (e.g., USB, Bluetooth, Ethernet, wireless Ethernet) may be coupled to one or more input/output devices 805, and other devices a keyboard 824, a pointing device (not shown), a scanner (not shown), or a networking device such as a switch or router, e.g., through a network adapter.

Still referring to FIG. 8, the centralized controller system 800 may be implemented in several different forms, as shown in the figure. For example, it may be implemented as a standard server 826, or multiple times in a group of such servers. In addition, it may be implemented in a personal computer such as a laptop computer 827. It may also be implemented as part of a rack server system 828. Alternatively, components from the computing device 800 may be combined with other components in a mobile device (not shown), such as a mobile computing device having different component configuration arranged for mobile devices.

Figure 9A:
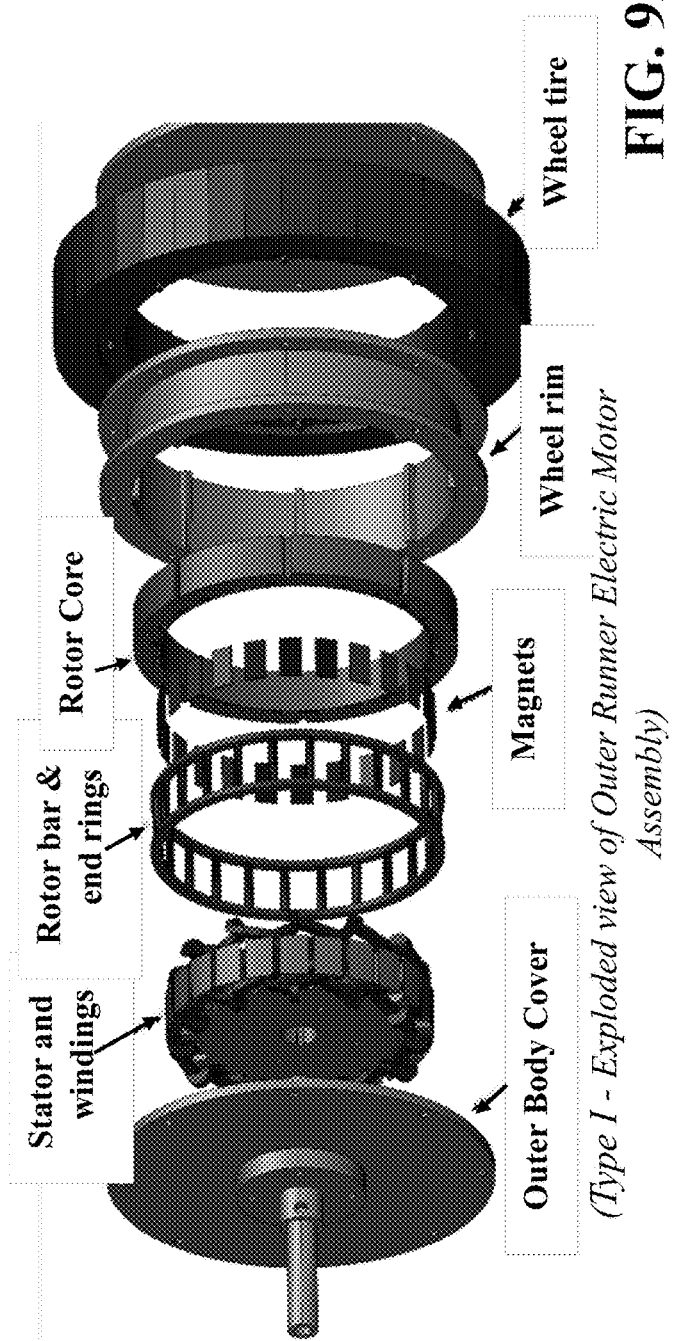
FIG. 9A and FIG. 9B are schematic diagrams of outer runner electric motors.
Figure 9B:
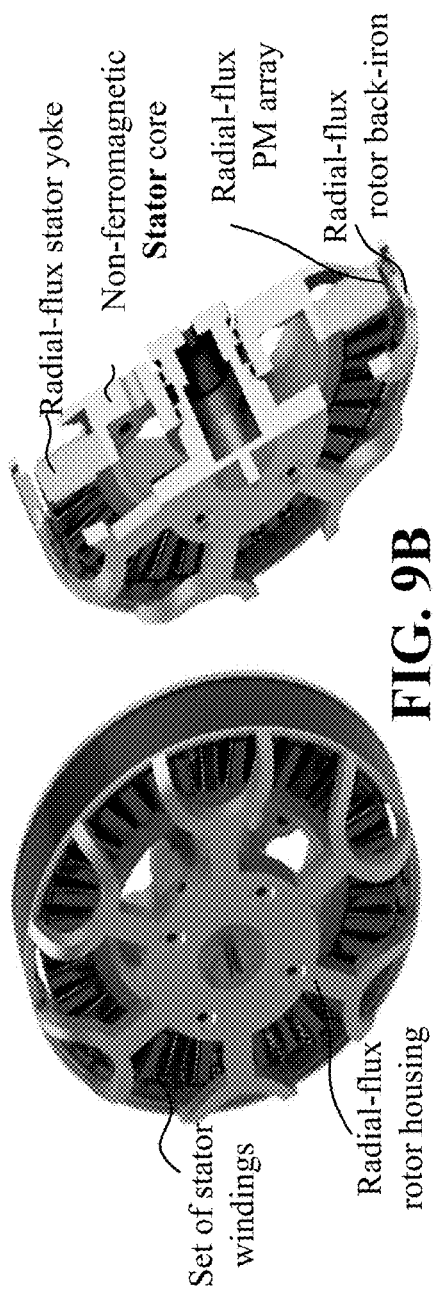

FIG. 9A and FIG. 9B are schematic diagrams of outer runner electric motors, FIG. 9A illustrates a Type I motor, and FIG. 9B illustrates a Type II motor, according to some embodiments of the present disclosure.

For example, FIG. 9A illustrates the type I machine having a stator and windings inside, but the windings are a normal type of distributed winding, not the toroidal winding type. The rotor, rotor core and magnets are outside, and has rotor bars and end rings. Wherein, the embodiments of the present disclosure have no rotor bars and end rings.

Further, FIG. 9B illustrates the type II machine having a stator, windings and a stator core inside, but the windings are normal type of concentrated winding, not the toroidal winding type. The rotor, rotor core and magnets are outside. However, both of the above types of machines have no axial-flux section, whereas the embodiments of the present disclosure have two axial-flux sections of stators and rotors on both axial ends.

Practical Applications

The embodiments of the present disclosure include embodiments with improved motor configurations including combined axial-flux and radial-flux motor designs and outer runner electric motor designs configured with direct-drive applications without gearboxes. These embodiments include stator assemblies with separate electrical-lamination-made stator yokes for axial-flux stator yokes and radial-flux stator yokes. Wherein some aspects for having electrical lamination can include increasing an amount of a motor's torque and reducing an amount of a motor's hysteresis loss. In addition, by incorporating stator assemblies with separate electrical-lamination-made stator yokes, allows for replacing a center volume of the stator core with non-ferromagnetic material, which effectively reduces a motor's total weight, and therefore improves a motor's torque-to-mass ratio. Among the above advantages and benefits, as well as other advantages and benefits, the embodiments of the present disclosure can be utilized in a number of different types of applications, such as, machine-room-less elevators, robot manipulators, precision rotary stages, and in-wheel drives for electric vehicles.

When compared with a conventional electric motors for general drivers, the embodiments of the present disclosure targeted and incorporated with direct-drive motors offer specific operational features such as having an ultra-high torque density, low nominal speed, and a relatively high efficiency with a compact form factor. For example, the embodiments of the present disclosure achieve high specific torque (torque per unit mass), high torque density (torque per unit overall volume). Other aspects of the embodiments of the present disclosure having direct-drive motor designs can include a relatively high efficiency, small torque-ripple along with having a compact form, as noted above.

Thus, based upon the innovative motor design configurations of the embodiments of the present disclosure, they are particular configured to be utilized in a number of different applications such as robot manipulators, precision rotary stages, and in-wheel drives for electric vehicles, since for these applications demand attributes of electric machines that have an increased torque & specific torque, compact size, reduced amount of overall weight, and other attributes associated with the above noted other advantages and benefits stated herein, which will outperform the same size and type conventional motors, as at least for the reasons stated herein.

Other applications for the innovative motor design configurations of the embodiments of the present disclosure, can also include various application areas, such as machine tools, industrial machinery, home appliances, electric vehicles, etc. Some other benefits and advantages of the embodiments of the present disclosure can include having a reduced an amount of the stator's manufacturing costs due to taking advantage of the conventional electrical laminations, i.e. when compared to a convention electric motor of the same size. Further, more benefits and advantages can include: (1) an increase in an amount of a motor's total torque due to the higher material permeability; (2) having a lower amount of hysteresis loss; (3) compact size; (4) a reduced amount of overall weight; (5) an improved amount of performance. The five above mentioned advantages are based on comparing each above stated advantage to an amount of a conventional motor or types of conventional motors of a same size and types conventional motors associated performance, a motor's size, a motor's volume, a motor's mass, a motor's weight, etc., as at least for the reasons stated herein.

Features

According to an embodiment of the present disclosure, electrical machine that is an axial-flux and radial-flux motor including a rotor mounted rotatably about a machine axis, with the rotor rotatively attached to a shaft. A stator assembly having a stator core with a non-ferromagnetic material and including a first axial-flux stator yoke having an inner wall rigidly attached on an outer surface of a first edge wall of the stator core. A second axial-flux stator yoke having an inner wall rigidly attached on an outer surface of a second edge wall of the stator core. Wherein the first and the second axial-flux stator yokes each include an outer wall with slots. A radial-flux stator yoke with slots includes a continuous inner wall rigidly attached on a continuous outer wall of the stator core. Wherein the radial-flux stator yoke and the first and the second axial-flux stator yokes include laminated sheets. Windings positioned in the slots of the first and the second axial-flux stator yokes and the radial-flux stator yoke. Wherein the following aspects below are contemplated as configuring a modified embodiment of the above embodiment for one or a combination of the following aspects below.

According to aspects of the present disclosure, an aspect that includes the stator assembly is rigidly attached to the shaft, and wherein the first and the second axial-flux stator yokes have slots in an axial direction, the radial-flux stator yoke has slots located on an outer diameter surface of the continuous outer wall of the stator core, and the windings include a set of toroid-shaped multiphase windings configured within the slots of the first and second axial-flux stator yokes and the radial-flux stator yoke. Wherein an aspect further comprises a two axial-flux rotor assembly rotatively attached to the shaft via bearings, and engages with the first and the second axial-flux stator yokes, each axial-flux rotor assembly having an axial-flux rotor housing rigidly attached to an outer race of bearings, an axial-flux rotor back-iron attached to the axial-flux rotor housing, and an axial-flux permanent magnet array attached to the axial-flux rotor back-iron.

Another aspect further comprising a radial-flux rotor assembly rigidly connected to an axial-flux rotor housing, and rotatively engaged with the radial-flux stator yoke. Wherein the radial-flux rotor assembly includes a radial-flux rotor housing rigidly attached to the axial-flux rotor housing, a radial-flux rotor back-iron attached to the radial-flux rotor housing, and a radial-flux permanent magnet array attached to the axial-flux rotor back-iron. Wherein an aspect can be that the axial-flux permanent magnet arrays of the two axial-flux rotor assembly and the radial-flux permanent magnet array each have alternative polarity. Another aspect is the first and second axial-flux stator yokes and the axial-flux rotor back-irons of the two axial-flux rotor assembly are made of spiral-shaped electrical lamination, or that the radial-flux stator yoke and radial-flux rotor back-iron are made of stacked electrical lamination. Another aspect is the non-ferromagnetic core is a material that is one of plastic, carbon fiber reinforced polymer, fiberglass or an iron (ferrous) free material. Another aspect can be the non-ferromagnetic material of the stator core includes at least 90% of one or more non-ferromagnetic materials.

Still another aspect is that the non-ferromagnetic material of the stator core is a material that is one of plastic, carbon fiber reinforced polymer, fiberglass or an iron (ferrous) free material. Another aspect is the non-ferromagnetic material of the stator core includes a level of an electrically conductive material and a level of mechanical stiffness associated with one of titanium, fiber glass or acetal homopolymer. Still another aspect is the non-ferromagnetic material of the stator core is a material that is one or more non-ferromagnetic metals obtained from sulfide, carbonate or silicate minerals, and is non-magnetic.

Wherein an aspect is the windings are wrapped around the assembled stator yoke and include a winding pattern having end turns which are termed toroidal windings. Such that the toroidal windings reduce an amount of a length of the end turns, resulting in an increase in an amount of overall efficiency of the electrical machine, when compared with a similarly configured electric machine without the toroidal windings. Wherein another aspect is the windings include a copper material and are wrapped around the assembled stator yoke that include a winding pattern with end turns that are termed toroidal windings, such that the toroidal windings reduces an amount of a length of the end turns, resulting in a total amount of a motor's windings copper loss which improves a motor's overall efficiency. At least one aspect further comprising a stationary shaft that is a hollow stationary shaft, wherein the rotor is rotatively attached to the stationary shaft using bearings, Wherein the windings are thermally connected to the stationary shaft. Wherein teeth on an inner surface of an inner wall of the one non-ferromagnetic core engage with slots on a surface of the stationary shaft, so that the stator assembly is fixed to the stationary shaft in order to transmit a torque action to produce a torque force. Wherein the thermal connection of the windings and the shaft is implemented using a thermally conductive and electrically insulating material of epoxy. An aspect is that bearings are utilized so the rotor is rotatively attached to the shaft, such that the shaft is a hollow stationary shaft. Wherein the stator core and the shaft include a coupling feature adapted to selectively couple and mate the stator core to the shaft, so that the stator assembly is fixed to the shaft in order to transmit a torque action and maintain an angular correspondence, to produce a torque force.

According to an aspect the radial-flux stator yoke includes stacked laminations of sheets that are electrically laminated and insulated from each other, such that sheets have substantially a same shape, and are stacked one on top of another in an axial direction or connected to one another. Another aspect is the first and second axial-flux stator yokes includes stacked laminations of sheets that are electrically laminated and insulated from each other, the stacked laminations of sheets are axisymmetric relative to a radial straight line, wherein the laminations for the first and second axial-flux stator yokes include the sheets stacked one on top of another in a radial direction or connected to one another. Still another aspect is the radial-flux stator yoke is ring-shaped and includes an includes an inner facing surface of a continuous inner wall rigidly attached on an outer facing surface of the continuous outer wall of the non-ferromagnetic core. Further an aspect is the windings are thermally connected to the shaft, such that the windings positioned in the slots of the first and the second axial-flux stator yokes and the radial-flux stator yoke, form a toroid-shaped stator assembly. It is possible an aspect is that the windings are wrapped around the assembled stator yoke to include multiple loops of magnetic copper wires and have three-phases along with a pole pair number. Another aspect is the non-ferromagnetic core is a material that is one or more non-ferromagnetic metals obtained from sulfide, carbonate or silicate minerals, and is non-magnetic.

Another aspect is that a pole pair number of the permanent magnet arrays matches with a pole-pair number of the stator winding to form a synchronous surface mount permanent magnet motor, or the pole pair number of the permanent magnet arrays matches with the stator slot number plus or minus the stator winding pole-pair number to form a vernier permanent magnet motor.

An electrical machine that is an outer runner electric motor, comprising: a rotor mounted rotatably about a machine axis, with the rotor rotatively attached to a shaft; a stator assembly including at least one non-ferromagnetic core; an axial-flux yoke an axial-flux yoke having an inner wall rigidly attached on an outer surface of a first edge wall of the stator core, or a radial-flux yoke having a continuous inner wall rigidly attached on a continuous outer wall of the stator core, wherein the axial-flux yoke or the radial-flux yoke, include laminated sheets, and the axial-flux yoke includes an outer wall with slots and the radial-flux yoke includes slots; windings are positioned in the slots of either the axial-flux stator yoke or the radial-flux stator yoke, and wherein the stator core and the shaft include a coupling feature adapted to selectively couple and mate the stator core to the shaft.

Definitions

According to aspects of the present disclosure, and based on experimentation, the following definitions have been established, and certainly are not a complete definition of each phrase or term. Wherein the provided definitions are merely provided as an example, based upon learnings from experimentation, wherein other interpretations, definitions, and other aspects may pertain. However, for at least a mere basic preview of the phrase or term presented, such definitions have been provided.

Torque: Torque is defined as the measure of the turning force on an object being rotated, such as a bolt or an automotive flywheel. Torque is a measure of the turning force on an object being rotated, such as a bolt or an automotive flywheel. Again, returning to basic physics:

T=F*r where T=torque, F=the force applied and r=the radius of the arc along which the force is applied, as shown in FIG. 2. Torque is usually expressed in units of Newton-meters or foot-pounds.

Torque Density: Torque density expresses the ratio of torque capability to volume, in units of Joules per cubic meter or foot-pounds per cubic foot. In short, torque density measures the torque-carrying capability of a component in each weight and space envelope. In short, it measures the torque-carrying capability of a component in each weight and space envelope. Why torque density is important in machine design: In the design of mechanical systems, torque density can be used to make smarter design decisions. Using consumer product analogies, purchase choices are often incorrectly made based on "brute force" factors such as how many Watts an amplifier puts out, or the horsepower rating of an engine in a pressure washer. More in-depth considerations review how efficiently an amplifier delivers a signal to its speakers, or how much water flow the pressure washer delivers at a certain pressure.

Paybacks from using torque density for product design and selection: The need to deliver torque is often a complex challenge. A traditional approach based on power or rotational speed might lead to unnecessarily bulky solutions. By using torque density as a key parameter, numerous paybacks can be achieved, such as: (a) More efficient operation through space savings; (b) Cost savings due to optimal component selection; (c) Innovative designs and new products; (d) Extended equipment life due to better-matched components; and (e) Noise reduction due to smaller motors. With torque density at the forefront, designers, manufactures, and end users can all benefit from smarter machine designs.

Magnetization: Magnetization, M is due to the tendency of the atomic components of matter to behave as magnetic dipoles. This magnetization is a sum of two parts: the magnetization due to the magnetic polarization present in the material and the induced polarization. The first is the primary magnetization, Mpri, and the latter the secondary magnetization. The primary magnetization is the magnetic field associated with the matter without any external excitation. This magnetic field originates from the magnetic dipoles in the matter. The secondary magnetization of the material is the polarization induced in the matter due to external fields.

Motor Windings: Motor windings can take many shapes or forms. However, 3-phase distributed windings are the most used in AC motors for industrial applications, which will be the focus of this article. The discussion which follows is equally applicable to the use of this type of winding in induction motors or in permanent magnet synchronous motors. The objective of the distributed winding is to produce a sinusoidal Magneto-Motive Force (MMF) distribution in the motor airgap. This MMF is produced when a balanced set of 3 phase AC currents flow in the phase windings. It is the MMF, combined with the motor magnetic circuit design, which gives rise to a travelling wave of flux in the airgap to produce the required motor torque. Windings are made up of several coils wound from insulated copper or in some cases aluminum wire. Several strands of wire can be connected in parallel to form a single conductor which is then wound into a coil which will have several turns. The number of turns will depend on specific design requirements. A distributed winding consists of several coils inserted into the slots of the motor stator as shown below. The number of coils will depend on the number of stator slots, the number of phases (in our case 3) and the number of motor poles, p. Each coil will span several slots. A full-pitch winding will have coils whose average span corresponds to a number of slots equal to the pole-pitch or 360°/p whereas a short-pitch winding will span fewer slots. The Figure below shows a full-pitch winding for a typical 4 pole motor. A part of the winding will be in the slot where it contributes to motor torque production. The remainder will be in the end windings which do not contribute to motor torque production. Careful design is therefore needed to avoid an unnecessary waste of expensive copper. Furthermore, good thermal performance drives the need for high slot fill and end winding thermal management. These factors are often limited by manufacturing process considerations. An ideal distributed winding will have an infinite number of coils placed in an infinite number of slots such that the MMF space distribution is a perfect sinusoid. This is clearly not possible in practice, so a best compromise needs to be found to meet the required performance. Coils of different phases need to be insulated from each other and from the stator core in order to avoid short circuits and failure. Insulation constitutes additional thermal barriers which will limit the ability to transfer heat from the inside of the machine to the outside. Air voids will be present between winding wires and between the insulation, winding and stator core. These voids are filled with a resin using an impregnation process which improves heat transfer and further improves winding insulation.

Electric motor Winding designs: Winding designs for electric motor applications are many and varied. Different applications impose different requirements on the motor design. Several of these requirements will be impacted by the winding design and can include: (a) Minimization of harmonic losses for improved efficiency; (b) Reduce torque pulsations; and (c) Reduce acoustic noise and vibrations. Several winding layouts are possible to achieve the same electrical performance. The choice of these layouts will be determined by manufacturing constraints which are strongly influenced by the level of automation used to produce the winding.

Flux: Flux is the presence of a force field in a specified physical medium, or the flow of energy through a surface. In electronics, the term applies to any electrostatic field and any magnetic field. Flux is depicted as "lines" in a plane that contains or intersects electric charge poles or magnetic poles.

Radial Flux: A radial flux motor has its flux running in and out from the center of the shaft—on the radius—thus, "radial". The air gap—the space between the rotor and the magnets—can also describe the motor, but when you're looking at the air gap, think of it as a dimension.

Torque: Torque is the measure of the circular force whose effect can rotate the object. In other words, it is the product of the force and the distance. The torque is also called the twisting power. The SI unit of torque is newton-meter and newton-meter is equivalent to joule. Examples of torque can be tightening or opening the cap of the bottle, we have applied force through the hand. The more force we apply, the more torque is increased. Also, for tightening or loosing the nut through spanner and for twisting the steering of the car torque is applied. Torque equal to Force times Distance.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements. Although the present disclosure has been described with reference to certain preferred embodiments, it is to be understood that various other adaptations and modifications can be made within the spirit and scope of the present disclosure.

What is claimed is:

1. An electrical machine that is an axial-flux and radial-flux motor, comprising:
    a rotor mounted rotatably about a machine axis, with the rotor rotatively attached to a shaft; and
    a stator assembly having a stator core with a non-ferromagnetic material and including
        a first axial-flux stator yoke having an inner wall rigidly attached on an outer surface of a first edge wall of the stator core, and a second axial-flux stator yoke having an inner wall rigidly attached on an outer surface of a second edge wall of the stator core, wherein the first and the second axial-flux stator yokes each include an outer wall with slots;
        a radial-flux stator yoke with slots includes a continuous inner wall rigidly attached on a continuous outer wall of the stator core, wherein the radial-flux stator yoke and the first and the second axial-flux stator yokes include laminated sheets; and
        windings positioned in the slots of the first and the second axial-flux stator yokes and the radial-flux stator yoke.

2. The electric machine of claim 1, wherein the stator assembly is rigidly attached to the shaft, and wherein the first and the second axial-flux stator yokes have slots in an axial direction, the radial-flux stator yoke has slots located on an outer diameter surface of the continuous outer wall of the stator core, and the windings include a set of toroid-shaped multiphase windings configured within the slots of the first and second axial-flux stator yokes and the radial-flux stator yoke.

3. The electrical machine of claim 1, further comprising:
    a two axial-flux rotor assembly rotatively attached to the shaft via bearings, and engages with the first and the second axial-flux stator yokes, each axial-flux rotor assembly having an axial-flux rotor housing rigidly attached to an outer race of bearings, an axial-flux rotor back-iron attached to the axial-flux rotor housing, and an axial-flux permanent magnet array attached to the axial-flux rotor back-iron.

4. The electrical machine of claim 3, further comprising:
    a radial-flux rotor assembly rigidly connected to an axial-flux rotor housing, and rotatively engaged with the radial-flux stator yoke,
    wherein the radial-flux rotor assembly includes a radial-flux rotor housing rigidly attached to the axial-flux rotor housing, a radial-flux rotor back-iron attached to the radial-flux rotor housing, and a radial-flux permanent magnet array attached to the axial-flux rotor back-iron.

5. The electrical machine of claim 4, wherein the axial-flux permanent magnet arrays of the two axial-flux rotor assembly and the radial-flux permanent magnet array each have alternative polarity.

6. The electrical machine of claim 4, wherein the first and second axial-flux stator yokes and the axial-flux rotor back-irons of the two axial-flux rotor assembly are made of spiral-shaped electrical lamination, or that the radial-flux stator yoke and radial-flux rotor back-iron are made of stacked electrical lamination.

7. The electrical machine to claim 1, wherein the non-ferromagnetic material of the stator core includes at least 90% of one or more non-ferromagnetic materials.

8. The electrical machine of claim 1, wherein the non-ferromagnetic material of the stator core is a material that is one of plastic, carbon fiber reinforced polymer, fiberglass or an iron (ferrous) free material.

9. The electrical machine of claim 1, wherein the non-ferromagnetic material of the stator core includes a level of an electrically conductive material and a level of mechanical stiffness associated with one of titanium, fiber glass or acetal homopolymer.

10. The electrical machine of claim 1, wherein the non-ferromagnetic material of the stator core is a material that is one or more non-ferromagnetic metals obtained from sulfide, carbonate or silicate minerals, and is non-magnetic.

11. The electrical machine of claim 1, wherein the windings are wrapped around the assembled stator yoke and include a winding pattern having end turns which are termed toroidal windings, such that the toroidal windings reduces an amount of a length of the end turns, resulting in an increase in an amount of overall efficiency of the electrical machine, when compared with a similarly configured electric machine without the toroidal windings.

12. The electrical machine to claim 1, wherein the windings include a copper material and are wrapped around the assembled stator yoke that include a winding pattern with end turns that are termed toroidal windings, such that the toroidal windings reduces an amount of a length of the end turns, resulting in a total amount of a motor's windings copper loss which improves a motor's overall efficiency.

13. The electrical machine of claim 1, wherein the windings are thermally connected to the shaft, such that the thermal connection of the windings and the shaft is implemented using a thermally conductive and electrically insulating material of epoxy.

14. The electrical machine of claim 1, further comprising:
    bearings are utilized so the rotor is rotatively attached to the shaft, such that the shaft is a hollow stationary shaft, and
    wherein the stator core and the shaft include a coupling feature adapted to selectively couple and mate the stator core to the shaft, so that the stator assembly is fixed to the shaft in order to transmit a torque action and maintain an angular correspondence, to produce a torque force.

15. An electrical machine that is an axial-flux and radial-flux motor, comprising:
    a rotor mounted rotatably about a machine axis, with the rotor rotatively attached to a stationary shaft; and
    a stator assembly including
        a stator core with a non-ferromagnetic material, the stator core including a first edge wall, a second edge wall and a continuous outer wall circumferentially positioned around the stator core;
        a first axial-flux stator yoke having an inner wall rigidly attached on an outer surface of a first edge wall of the stator core, and a second axial-flux stator yoke having an inner wall rigidly attached on an outer surface of a second edge wall of the stator core, wherein the first and the second axial-flux stator yokes each include an outer wall with slots;

a radial-flux stator yoke with slots includes a continuous inner wall rigidly attached on a continuous outer wall of the stator core, wherein the radial-flux stator yoke and the first and the second axial-flux stator yokes include laminated sheets; and windings positioned in the slots of the first and the second axial-flux stator yokes and the radial-flux stator yoke, wherein the stator assembly is fixed to the stationary shaft of which the rotor rotates around the same stationary shaft, in order to transmit a torque action to produce a torque force.

16. The electrical machine of claim 15, wherein the radial-flux stator yoke includes stacked laminations of sheets that are electrically laminated and insulated from each other, such that sheets have substantially a same shape, and are stacked one on top of another in an axial direction or connected to one another.

17. The electrical machine of claim 15, wherein the first and second axial-flux stator yokes includes stacked laminations of sheets that are electrically laminated and insulated from each other, the stacked laminations of sheets are axisymmetric relative to a radial straight line, wherein the laminations for the first and second axial-flux stator yokes include the sheets stacked one on top of another in a radial direction or connected to one another.

18. The electrical machine of claim 15, wherein the radial-flux stator yoke is ring-shaped and includes an includes an inner facing surface of a continuous inner wall rigidly attached on an outer facing surface of the continuous outer wall of the non-ferromagnetic core.

19. The electrical machine of claim 15, wherein the windings are wrapped around the assembled stator yoke to include multiple loops of magnetic copper wires and have three-phases along with a pole pair number.

20. An electrical machine that is an axial-flux and radial-flux motor, comprising:
 a rotor mounted rotatably about a machine axis;
 a stator assembly including
  a fixed non-ferromagnetic stator core attached to the shaft;
  a first axial-flux stator yoke and a second axial-flux stator yoke both having slots in an axial direction;
  a radial-flux stator yoke with slots is positioned on an outer diameter surface of the fixed non-ferromagnetic stator core, and a set of toroid-shaped multi-phase winding configured within the slots of the first and the second axial-flux stator yokes the radial-flux stator yoke;
  two axial-flux rotor assemblies rotatively attached to the shaft, and engage with the first and the second axial-flux stator yokes, each axial-flux rotor assembly includes an axial-flux rotor housing rigidly attached to an outer race of bearings, an axial-flux rotor back-iron attached to the axial-flux rotor housing, and an axial-flux permanent magnet array attached to the axial-flux rotor back-iron; and
  a radial-flux rotor assembly rigidly connected to both axial-flux rotor housings, and rotatively engaged with a radial-flux stator yoke, the radial-flux rotor assembly has a radial-flux rotor housing rigidly attached to the both axial-flux rotor housings, a radial-flux rotor back-iron attached to the radial-flux rotor housing, and a radial-flux permanent magnet array attached to the both axial-flux rotor back-irons.

21. The electrical machine of claim 20, wherein a pole pair number of the permanent magnet arrays matches with a pole-pair number of the stator winding to form a synchronous surface mount permanent magnet motor, or the pole pair number of the permanent magnet arrays matches with the stator slot number plus or minus the stator winding pole-pair number to form a vernier permanent magnet motor.

22. A system comprising:
 a transceiver to receive signals from sensors associated with an axial-flux and radial-flux (AFARF) motor;
 a digital controller configured to receive the signals, and generate control signals specifying values of one or combination of a multi-phase voltage or a current for the AFARF motor, for tracking a reference trajectory of torques of the AFARF motor, and wherein the AFARF motor has a load whose position is controlled by the AFARF motor and is controllable by the digital controller, such that the AFARF motor includes:
  a rotor mounted rotatably about a machine axis, with the rotor rotatively attached to a shaft; and
  a stator assembly having a stator core with a non-ferromagnetic material and including
   a first axial-flux stator yoke having an inner wall rigidly attached on an outer surface of a first edge wall of the stator core, and a second axial-flux stator yoke having an inner wall rigidly attached on an outer surface of a second edge wall of the stator core, wherein the first and the second axial-flux stator yokes each include an outer wall with slots;
   a radial-flux stator yoke with slots includes a continuous inner wall rigidly attached on a continuous outer wall of the stator core, wherein the radial-flux stator yoke and the first and the second axial-flux stator yokes include laminated sheets; and
   windings positioned in the slots of the first and the second axial-flux stator yokes and the radial-flux stator yoke that form a toroid-shaped stator assembly; and
 an inverter in communication with the digital controller and the AFARF motor, is configured to supply the multi-phase voltage and the current generated according to the generated control signals to multi-phase windings of the AFARF motor to reduce an error between the reference trajectory and a measured torque of the AFARF motor, if the error is above a predetermined error threshold.

* * * * *